(12) United States Patent
Wang et al.

(10) Patent No.: US 12,348,662 B2
(45) Date of Patent: Jul. 1, 2025

(54) VOLUME MANAGEMENT METHOD AND ELECTRONIC DEVICE

(71) Applicant: HONOR DEVICE CO., LTD., Shenzhen (CN)

(72) Inventors: Deyuan Wang, Shenzhen (CN); Fukai Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/010,278

(22) PCT Filed: Apr. 8, 2022

(86) PCT No.: PCT/CN2022/085855
§ 371 (c)(1),
(2) Date: Dec. 14, 2022

(87) PCT Pub. No.: WO2022/262387
PCT Pub. Date: Dec. 22, 2022

(65) Prior Publication Data
US 2024/0305708 A1 Sep. 12, 2024

(30) Foreign Application Priority Data
Jun. 16, 2021 (CN) .......................... 202110667934.0

(51) Int. Cl.
*H04M 1/72412* (2021.01)
*H04M 1/72442* (2021.01)

(52) U.S. Cl.
CPC ... *H04M 1/72412* (2021.01); *H04M 1/72442* (2021.01)

(58) Field of Classification Search
CPC ......... H04M 1/72412; H04M 1/72442; H04M 2250/02; G06F 11/324
See application file for complete search history.

(56) References Cited

U.S. PATENT DOCUMENTS

| | | | |
|---|---|---|---|
| 10,448,093 | B2 | 10/2019 | Zeng et al. |
| 2020/0379713 | A1* | 12/2020 | Carrigan ............... G06F 3/0481 |
| 2022/0210559 | A1 | 6/2022 | Ryu et al. |

FOREIGN PATENT DOCUMENTS

| | | |
|---|---|---|
| CN | 101075828 A | 11/2007 |
| CN | 105392050 A | 3/2016 |

(Continued)

OTHER PUBLICATIONS

"Simultaneous Use of HFP, A2DP, and AVRCP Profiles", A/V Working group, Nov. 8, 2008, 46 pages.

(Continued)

*Primary Examiner* — Tuan H Nguyen

(57) ABSTRACT

Embodiments of this application belong to the field of audio technologies, and provide a volume management method and an electronic device. The method is applicable to a smart terminal, including: sending a message to a Bluetooth audio device; receiving a message sent by the Bluetooth audio device, where the message includes a CT attribute and a TG attribute determined by the Bluetooth audio device based on an AVRCP; determining, according to the TG attribute, whether the Bluetooth audio device supports an absolute volume; and setting an absolute-volume switch control corresponding to the Bluetooth audio device to a displayed state when it is determined that the Bluetooth audio device supports the absolute volume. According to the method, it is determined, based on the TG attribute in the Bluetooth AVRCP, whether the Bluetooth audio device supports an absolute volume attribute, thereby improving accuracy of identifying an absolute volume of a device.

18 Claims, 19 Drawing Sheets

(56) References Cited

FOREIGN PATENT DOCUMENTS

| CN | 106488039 A | 3/2017 |
| CN | 110768697 A | 2/2020 |
| CN | 112073865 A | 12/2020 |
| CN | 112889096 A | 6/2021 |
| CN | 113572890 A | 10/2021 |
| JP | 2011024046 A | 2/2011 |
| JP | 2017017654 A | 1/2017 |
| WO | 2017075988 A1 | 5/2017 |
| WO | 2021071222 A1 | 4/2021 |

OTHER PUBLICATIONS

AU-Audio Video Working Group: "Bluetooth Doc Date/ YearMonth-Day Approved Revision Document No. Jun. 26, 2008 V14r00 AVRCP_SPEC Prepared e-mail address Audio/Video Remote Control Profile", Jun. 26, 2008 (Jun. 26, 2008), 166 pages.

Qian Lixin, et al. "Bluetooth Audio/Video Control," Application Research of Computers. 2002(07) p. 149-151.

Post Bar User_7PS6yN6, "Where is the Bluetooth absolute vol. setting?" Baidu Tieba Honor Ba, Mar. 5, 2021, 5 pages.

Xiamen Hou, "After upgrading Hongmeng, the volume of bluetooth headset becomes smaller," Baidu Experience, Jun. 10, 2021, 6 pages.

Ah Qiu takes you to see the world, "How to solve the problem that the volume of the Bluetooth headset becomes low after upgrading Hongmeng?" Baidu Experience, Jun. 11, 2021, 7 pages.

Niu Xinxin, et al. "Design of Bluetooth Vehicle System with Secret Call Function," Radio Engineering of China. 2005 (01) p. 3-5+58.

bluetooth.org, AVRCP Spec V13, «Bluetooth Doc», Dec. 31, 2019, 93 pages.

Audio Video WG, Audio/Video Remote Control Profile, AVRCP V.13, Apr. 16, 2007, 93 pages. URL:https://www.docin.com/p-2284456239.html.

* cited by examiner

Smart terminal 100

Bluetooth audio device 200

VOLUME MANAGEMENT METHOD AND ELECTRONIC DEVICE

CROSS-REFERENCE TO RELATED APPLICATIONS

This application is a national stage of International Application No. PCT/CN2022/085855, filed on Apr. 8, 2022, which claims priority to Chinese Patent Application No. 202110667934.0, filed on Jun. 16, 2021. The disclosures of both of the aforementioned applications are hereby incorporated by reference in their entireties.

TECHNICAL FIELD

This application relates to the field of audio technologies, and in particular, to a volume management method and an electronic device.

BACKGROUND

An operation of volume adjustment is always unavoidable in Bluetooth music playback. A common scenario in life is that a mobile phone is connected to a Bluetooth headset or a speaker to play music, and a Bluetooth music volume is adjusted by adjusting a multimedia volume of the mobile phone. However, during daily volume adjustment, problems such as an adjustment failure of a low volume or due to a sudden change of the volume often occur, which seriously affects audio listening experience of a user.

SUMMARY

This application provides a volume management method and an electronic device. According to the method, it is identified, based on a TG attribute in an AVRCP, whether a Bluetooth audio device supports an absolute volume attribute, which can improve accuracy of identifying an absolute volume of a device.

According to a first aspect, a volume management method is provided. The method is applicable to a smart terminal, and includes: sending a service function inquiry message to a Bluetooth audio device: receiving a service function response message sent by the Bluetooth audio device, where the service function response message includes a control device CT attribute and a target device TG attribute determined by the Bluetooth audio device based on an audio/video remote control profile AVRCP: determining, according to the TG attribute, whether the Bluetooth audio device supports an absolute volume; and setting an absolute-volume switch control corresponding to the Bluetooth audio device to a displayed state when it is determined that the Bluetooth audio device supports the absolute volume, so that the absolute-volume switch control is presented on an interface of the smart terminal.

The displayed state in this implementation is relative to a hidden state, which may be understood that a switch control corresponding to the Bluetooth audio device can be intuitively presented to a user on a smart terminal interface.

According to the volume management method provided in this implementation, an independent management function for the absolute volume of the Bluetooth audio device that supports the absolute-volume function is created on a user interface of the smart terminal. Therefore, it is convenient for the user to accurately control enabling or disabling of an absolute volume of a specific Bluetooth audio device, and personalized usage requirements of the user for the absolute-volume function of the specific Bluetooth audio device in different scenarios can be flexibly satisfied. With reference to the first aspect, in some implementations of the first aspect, when it is determined that the Bluetooth audio device supports the absolute volume, the method further includes: setting the absolute-volume switch control corresponding to the Bluetooth audio device to a default enabled state.

With reference to the first aspect, in some implementations of the first aspect, the method further includes: receiving a first operation inputted by a user; and displaying, in response to the first operation, a first target interface when it is determined that the Bluetooth audio device supports the absolute volume, where the first target interface includes the absolute-volume switch control corresponding to the Bluetooth audio device.

According to the volume management method provided in this implementation, for the Bluetooth audio device that supports the absolute volume, the smart terminal displays the absolute-volume control of the Bluetooth audio device, so that the user can independently enable or disable the absolute volume corresponding to the Bluetooth audio device as required. That is to say, the user determines whether to synchronously adjust a volume of a mobile phone and a volume of the Bluetooth audio device.

With reference to the first aspect, in some implementations of the first aspect, the method further includes: inquiring a configuration file for absolute-volume identification information corresponding to the Bluetooth audio device in response to the first operation of the user, where the absolute-volume identification information is used for indicating whether the Bluetooth audio device supports the absolute volume; and generating the absolute-volume switch control corresponding to the Bluetooth audio device when it is determined according to the absolute-volume identification information that the Bluetooth audio device supports the absolute volume.

According to the volume management method provided in this implementation, an independent management function for the absolute volume of the Bluetooth audio device that supports the absolute-volume function is created on a user interface of the smart terminal. Therefore, it is convenient for the user to accurately control enabling or disabling of an absolute volume of a specific Bluetooth audio device, and personalized usage requirements of the user for the absolute-volume function of the specific Bluetooth audio device in different scenarios can be flexibly satisfied.

With reference to the first aspect, in some implementations of the first aspect, the generating the absolute-volume switch control corresponding to the Bluetooth audio device when it is determined according to the absolute-volume identification information that the Bluetooth audio device supports the absolute volume specifically includes: detecting whether the Bluetooth audio device is a device in a preset blacklist when the absolute-volume identification information indicates that the Bluetooth audio device supports the absolute volume; and generating the absolute-volume switch control corresponding to the Bluetooth audio device when the Bluetooth audio device is not the device in the preset blacklist.

According to the volume management method provided in this implementation, the device that supports the absolute volume but has an absolute volume effect that does not meet expectations is added to a blacklist. In this way, it can be ensured that when the volume of the Bluetooth audio device is adjusted by using the absolute volume, the volume of the Bluetooth audio device is synchronously changed successfully and efficiently.

With reference to the first aspect, in some implementations of the first aspect, the method further includes: detecting a device type of the Bluetooth audio device; and setting the absolute-volume switch control corresponding to the Bluetooth audio device to the displayed state when it is determined according to a detection result that the Bluetooth audio device is not an onboard device.

According to the volume management method provided in this implementation, the absolute volume of the Bluetooth audio device of the onboard device type is disabled by default, so as to avoid a problem that the user cannot obtain audio listening experience with a stable volume due to uneven performance of the onboard device in the absolute-volume function.

With reference to the first aspect, in some implementations of the first aspect, the detecting a device type of the Bluetooth audio device specifically includes: detecting whether input/output capability IOCap information of the Bluetooth audio device includes display capability information corresponding to the Bluetooth audio device: and determining that the device type corresponding to the Bluetooth audio device is the onboard device when the IOCap includes the display capability information.

With reference to the first aspect, in some implementations of the first aspect, the determining, according to the TG attribute, whether the Bluetooth audio device supports an absolute volume specifically includes: determining that the Bluetooth audio device supports the absolute volume when the TG attribute includes CAT2 information of an audio and video monitor/amplifier; and determining that the Bluetooth audio device does not support the absolute volume when the TG attribute does not include the CAT2 information.

With reference to the first aspect, in some implementations of the first aspect, the first operation includes: tapping a setting application icon by the user: or tapping a Bluetooth device management bar by the user.

With reference to the first aspect, in some implementations of the first aspect, the first target interface is an interface in a setting application.

According to a second aspect, a smart terminal is provided, including at least one processor, a memory, and a communication interface. The communication interface is configured to communicate with other devices, the memory includes computer program instructions. The computer program instructions, when executed in the processor, cause the smart terminal to perform the method according to any of the implementations of the first aspect.

According to a third aspect, a volume management system is provided, including a smart terminal and a Bluetooth audio device. The smart terminal is configured to perform the method according to any of the implementations of the first aspect. The Bluetooth audio device is configured to synchronously adjust a volume according to control performed on the Bluetooth audio device by the smart terminal based on the absolute volume.

According to a fourth aspect, a non-transitory computer-readable storage medium is provided. The non-transitory computer-readable storage medium stores a computer-executable program. The computer-executable program, when invoked by a computer, causes the computer to perform the method according to any of the implementations of the first aspect.

According to a fifth aspect, a chip system is provided, including: a communication interface, configured to input and/or output information: a memory, configured to store a computer-executable program; and a processor, configured to execute the computer-executable program, so that a device installed with the chip system performs the method according to any of the implementations of the first aspect.

DESCRIPTION OF EMBODIMENTS

Figure 1A:
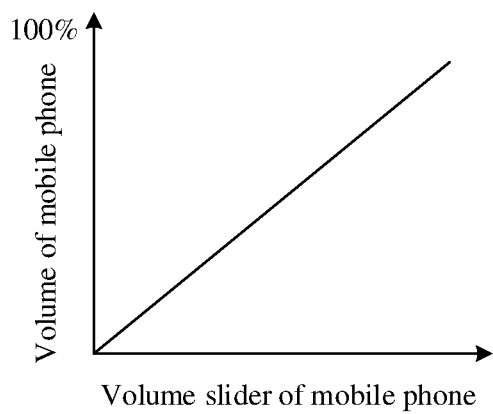
FIG. 1A to FIG. 1C are schematic diagrams of volume changes in the case of a relative volume according to an embodiment of this application.

It should be noted that terms used in the implementations of the embodiments of this application are merely used to explain specific embodiments of this application, but are not intended to limit this application. In description of embodiments of this application, unless otherwise specified, "/" means or. For example, A/B may mean A or B. In this specification, "and/or" describes only an association relationship for describing associated objects and indicates that three relationships may exist. For example, A and/or B may represent the following three cases: Only A exists, both A and B exist, and only B exists. In addition, in the description of the embodiments of this application, unless otherwise specified, "a plurality of" means two or more than two, and "at least one" and "one or more" mean one, two, or more than two.

The terms "first" and "second" mentioned below are merely intended for a purpose of description, and shall not be understood as an indication or implication of relative importance or implicit indication of the quantity of indicated technical features. Therefore, a feature defined by "first" or "second" can explicitly or implicitly includes one or more features.

Reference to "one embodiment", "some embodiments", or the like described in this specification means that a particular feature, structure, or characteristic described in connection with the embodiment is included in one or more embodiments of this application. Therefore, phrases "in one embodiment", "in some embodiments", "in some other embodiments", "in some additional embodiments", and the like described in different places in this specification do not mean that all necessarily refer to the same embodiment, but mean "one or more but not all of embodiments", unless otherwise specifically emphasized. The terms "comprising", "including", "having" and their variants all mean "including but not limited to", unless otherwise specifically emphasized.

The technical solutions of the embodiments of this application may be applied to various communication systems, for example, a global system of mobile communication (global system of mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunication system (universal mobile telecommunication system, UMTS), a worldwide interoperability for microwave access (worldwide interoperability for microwave access, WiMAX) communication system, a future 5th generation (5th generation, 5G) system, or a new radio (new radio, NR) system.

In order to better understand the volume management method according to the embodiments of this application, the following first describes definitions of terms involved in the embodiments of this application.

1. Relative Volume and Absolute Volume (Absolute Volume)

A mobile phone and a Bluetooth headset connected to the mobile phone are used as an example. A mobile phone terminal and a headset terminal generally have their own volume. An aural volume outputted by the headset is generally a volume obtained after a volume of the mobile phone is multiplied by a volume of the headset. The relative volume means that the mobile phone and the Bluetooth headset independently adjust their own volume, and a change of a volume slider of the mobile phone or a change of a volume slider of the Bluetooth headset may cause a change of the aural volume. The absolute volume means that a default volume of the mobile phone by default is 100% (for example, when the volume slider of the mobile phone is not 0). When the volume of the mobile phone is adjusted, the volume of the Bluetooth headset changes synchronously with the adjusted volume of the mobile phone, while the volume of the mobile phone (100%) remains unchanged. That is to say, in the absolute volume, the mobile phone is configured to synchronize the volume of the Bluetooth headset with the volume of the mobile phone when the Bluetooth headset is connected to the mobile phone to play an audio. When the volume of the mobile phone is maximized, the volume of the headset terminal is also the maximum. The absolute volume also means that media volumes are synchronized.

In order to understand concepts of the relative volume and the absolute volume more clearly, an exemplary description is given below with reference to the accompanying drawings and several specific volume adjustment cases.

Case I: Volume Adjustment in the Relative Volume

Figure 1B:
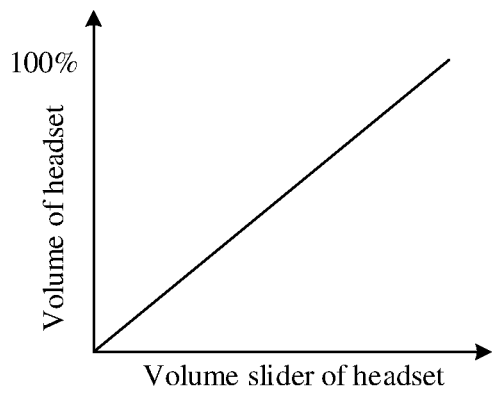
Figure 1C:
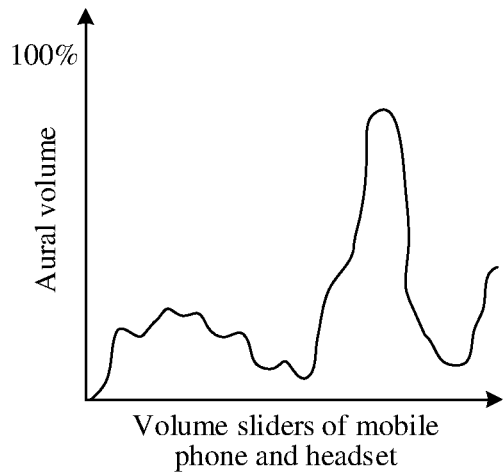

As shown in FIG. 1A to FIG. 1C, FIG. 1A to FIG. 1C are respectively a schematic diagram of a variation of a volume of a mobile phone with a volume slider, a schematic diagram of a variation of a volume of a Bluetooth headset with the volume slider, and a schematic diagram of a variation of an aural volume with the volume sliders of the mobile phone and the Bluetooth headset in the case of the relative volume.

In the case of the relative volume, a user may separately adjust the volume of the mobile phone and the volume of the Bluetooth headset by adjusting the volume sliders of the mobile phone and the Bluetooth headset. Assuming that the user adjusts the volume of the mobile phone to 60% and the volume of the Bluetooth headset to 50%, at this point, the aural volume is 30% (that is, 60%×50%).

Since the volume of the mobile phone and the volume of the headset have various product combinations, the aural volume changes irregularly in this case (as shown in FIG. 1C), and the aural volume may be prone to sudden changes, resulting in poor listening experience for the user.

Case II: Volume Adjustment in the Absolute Volume

Figure 2A:
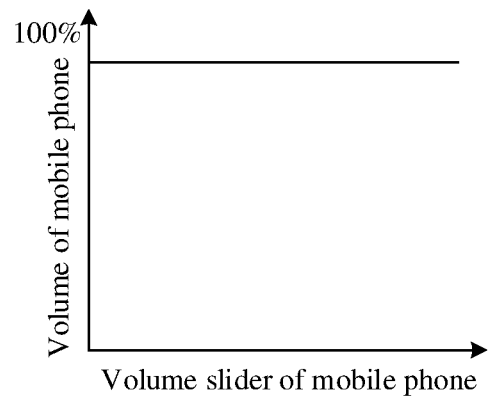
FIG. 2A to FIG. 2C are schematic diagrams of volume changes in the case of an absolute volume according to an embodiment of this application.
Figure 2B:
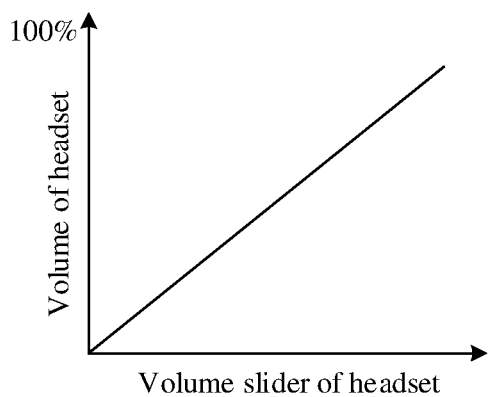
Figure 2C:
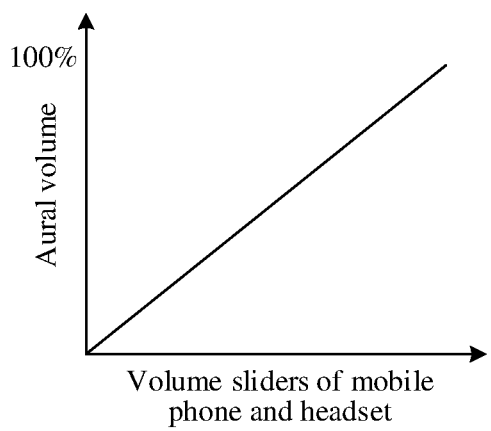

As shown in FIG. 2A to FIG. 2C, FIG. 2A to FIG. 2C are respectively a schematic diagram of a variation of a volume of a mobile phone with a volume slider, a schematic diagram of a variation of a volume of a Bluetooth headset with the volume slider, and a schematic diagram of a variation of an aural volume with the volume sliders of the mobile phone and the Bluetooth headset in the case of the absolute volume.

In the case of the absolute volume, the volume of the mobile phone remains at 100% by default (for example, when the volume slider of the mobile phone is not 0). That is to say, when the user adjusts the volume slider of the mobile phone, the volume of the mobile phone always maintains the maximum volume (100%) (as shown in FIG. 2A) without being affected by the change of the volume slider, while the volume of the Bluetooth headset changes synchronously with the change of the volume slider of the mobile phone. Assuming that the user adjusts the volume slider of the mobile phone to increase from 60% to 80%, in the process, the volume of the mobile phone remains at 100%, and the volume of the Bluetooth headset increases from 60% to 80% synchronously with the volume slider of the mobile phone. Accordingly, the aural volume of the Bluetooth headset also increases from 60% (that is, 100%× 60%) to 80% (that is, 100%×80%).

It should be understood that in this case, the user may synchronously adjust the volume of the Bluetooth headset by adjusting the volume slider on the mobile phone. That is to say, the mobile phone may be regarded as a controller or a remote control for the user to adjust the volume of the Bluetooth headset. In this way, the user may adjust the volume of the Bluetooth headset more conveniently, and may obtain an actual aural volume that matches the volume slider of the mobile phone.

Case III: The Bluetooth headset supports the absolute volume, but the mobile phone does not use the absolute volume for volume adjustment.

Figure 3A:
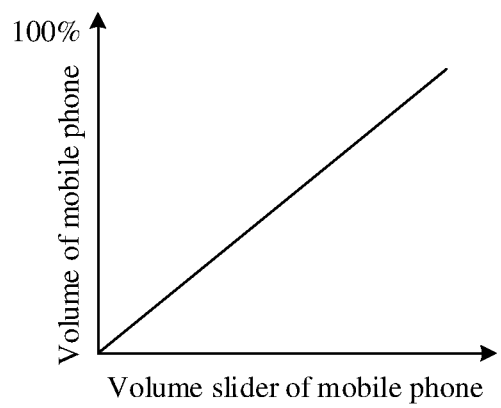
FIG. 3A to FIG. 3C are schematic diagrams of volume changes in a case where an absolute volume adjustment is not performed on a device supporting an absolute volume according to an embodiment of this application.
Figure 3B:
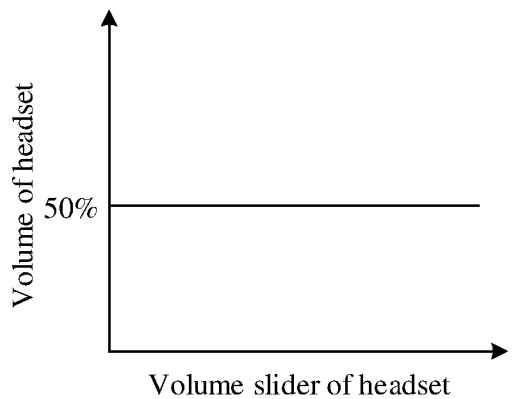
Figure 3C:
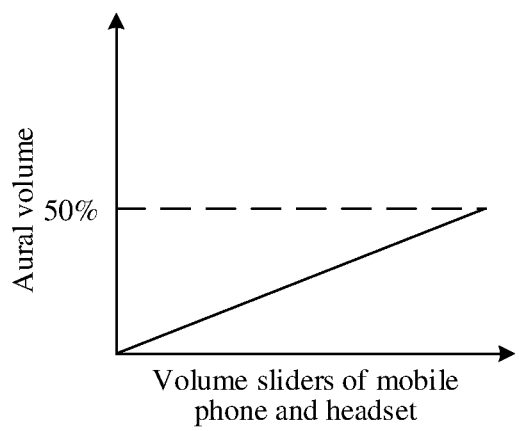

As shown in FIG. 3A to FIG. 3C, FIG. 3A to FIG. 3C are respectively a schematic diagram of a variation of a volume of a mobile phone with a volume slider, a schematic diagram of a variation of a volume of a Bluetooth headset with the volume slider, and a schematic diagram of a variation of an aural volume with the volume sliders of the mobile phone and the Bluetooth headset in Case III.

In some scenarios, for the Bluetooth headset on which no absolute-volume function detection is performed or of which absolute volume-related information is not acquired, the mobile phone generally regards the Bluetooth headset as a device that does not support the absolute volume, and does not synchronously adjust the volume of the Bluetooth headset by using the absolute volume. In this case, when the user adjusts the volume slider of the mobile phone, the aural volume of the Bluetooth headset changes synchronously with the change of the volume slider of the mobile phone that does not exceed a range of the volumes set by the Bluetooth headset itself. For example, assuming that the volume of the Bluetooth audio device is set to 50% at this time (as shown in FIG. 3B), and the user adjusts the volume slider of the mobile phone from 0% to 100%, the aural volume of the Bluetooth headset increases from 0% (that is, 0%×50%) to 50% (that is, 100%×50%) (as shown in FIG. 3C), and the maximum aural volume does not exceed the volume set by the Bluetooth audio device itself.

It may be understood that in this case, the aural volume of the Bluetooth headset accordingly changes with the volume of the mobile phone only within the range of 0% to the volume of the Bluetooth audio device itself (such as 50%), which causes the user to listen at a lower aural volume and have poor experience.

2. Developer Option

A developer option of the smart terminal (such as the mobile phone) is a function option for software development and test preparation that is provided for a system and a software developer. Generally, software developed based on an Android (Android) system is required to pass the test and then installed in a device such as a mobile phone. When the software development is completed, the developer uses the developer option to send the software to the mobile phone for an entity test. A common user may also use various functions in the developer option to set the mobile phone, for example, adjusting a scaling speed of window animation and transition animation, limiting a number of background processes, forcing rendering of a graphics processing unit (graphics processing unit, GPU), and the like. However, since the developer option is relatively complicated to operate, it is difficult for the common user to operate the developer option.

In some cases, the absolute-volume function may be disabled by default in the developer option, and then the absolute volume is managed by using a white list. The implementation process of the white list management mode may include the following, for example. The developer detects the absolute volume of the device, and manually adds, to the white list, an identifier of the device that supports the absolute volume, and then sends the white list to the smart terminal by using a server. When the smart terminal is connected to a certain Bluetooth audio device, the smart terminal may inquire whether the white list includes the identifier of the Bluetooth audio device. If so, the absolute volume of the Bluetooth audio device is enabled. In other words, when the absolute volume of the device is managed by using the white list, if the smart terminal is connected to the device in the white list, the absolute volume of the device is set to an enabled state.

3. Audio/Video Remote Control Profile (Audio/Video Remote Control Profile, AVRCP)

The AVRCP defines characteristics and a process of communication between a Bluetooth audio/video device and a Bluetooth audio/video control device. In a Bluetooth scenario, the AVRCP is used for controlling a Bluetooth audio (for example, a piece of music), for example, Play/Pause, Previous, or Next, for acquiring a playback status, and so on. The AVRCP divides related devices into a control device Controller (CT) (described as the smart terminal below) and a target device Target (TG) (described as the Bluetooth audio device below). The CT is a device responsible for sending a command frame to the target device to initiate transmission. In general, the CT may be a Bluetooth headset, a Bluetooth speaker, an onboard device, and the like. The TG is a device responsible for receiving a command and making a response according to the command. In general, the TG may be a PC, a tablet computer, a mobile phone, and the like.

For example, in a scenario where the onboard device plays a song in the mobile phone list, when the user taps a next track on the onboard device, the onboard device requests the mobile phone to play the next track in the list. At this point, the onboard device serves as a CT role, and the mobile phone serves as a TG role.

For another example, in a scenario where the Bluetooth headset plays the song in the playlist of the mobile phone, the Bluetooth headset subscribes to a notification (notification) for the mobile phone to acquire a song playback status in the mobile phone. When the user taps the mobile phone to play the next track, the Bluetooth headset acquires a state change based on the notification, and requests the mobile phone to send relevant information (audio data, song information, and the like) of the next track to the Bluetooth headset, so that the Bluetooth headset also switches to the next track. At this point, the Bluetooth headset serves as the CT role, and the mobile phone serves as the TG role.

It should be understood that in most current scenarios, the Bluetooth audio device such as the Bluetooth headset generally serves as the CT role, and the smart terminal such as the mobile phone serves as the TG role. However, in an absolute-volume scenario, after an AVRCP connection is established between the smart terminal and the Bluetooth audio device, the smart terminal generally serves as the CT role, and the Bluetooth audio device generally serves as the TG role. That is to say, in different scenarios, the CT role or the TG role of the same device may change.

For example, in the scenario where the aural volume of the Bluetooth headset is adjusted by using the absolute volume, the user may adjust the aural volume of the Bluetooth headset by adjusting the volume slider of the mobile phone. At this point, the mobile phone may be configured as the CT role in the scenario, and the Bluetooth headset with the volume passively adjusted may be configured as the TG role.

4. Controller Attribute and Target Attribute

A controller attribute (collectively referred to as a CT attribute below) may include functions supported by the device serving as the Controller role, for example: connection establishment for control (Connection establishment for control), connection release for control (Connection release for control), AVRCP version information of the Bluetooth audio device, metadata (metadata) (such as song information), file browsing information, and the like.

A Target attribute (collectively referred to as a TG attribute below) may include functions supported by the device as the Target role, for example: connection establishment for control (Connection establishment for control), connection release for control (Connection release for control), AV/C Info commands, and the like.

In combination with the above content, the current method for determining whether the Bluetooth audio device supports the absolute volume has some limitations, and deviation often exists in an identification result. For example, the Bluetooth audio device that actually supports the absolute volume is likely to be identified as not supporting the absolute volume, and the like. As a result, the volume of the Bluetooth audio device cannot be adjusted normally according to requirements of the user, which seriously affects user experience.

For ease of understanding, reasons that easily lead to an error in identification of the absolute volume are described below by using a specific process as an example with reference to the accompanying drawings.

Figure 4:
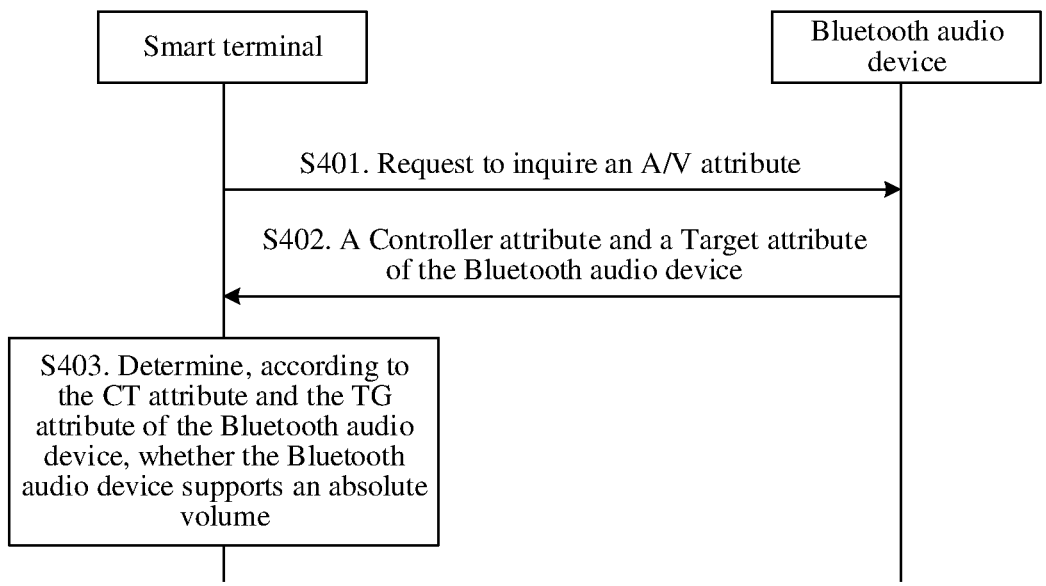
FIG. 4 is a schematic flowchart of a method for identifying an absolute-volume function of a device.

For example, as shown in FIG. 4, FIG. 4 is a schematic flowchart of a method for determining whether a device supports an absolute-volume function. The process includes the following steps.

S401: A smart terminal initiates a request to a Bluetooth audio device to inquire an audio/video (audio/vedio, A/V) attribute.

S402: The Bluetooth audio device returns the A/V attribute of the Bluetooth audio device to the smart terminal in response to the inquiry request of the smart terminal, where the A/V attribute specifically includes a CT attribute and a TG attribute of the Bluetooth audio device.

S403: The smart terminal identifies, according to the CT attribute and the TG attribute of the Bluetooth audio device, whether the Bluetooth audio device supports an absolute volume.

Figure 5:
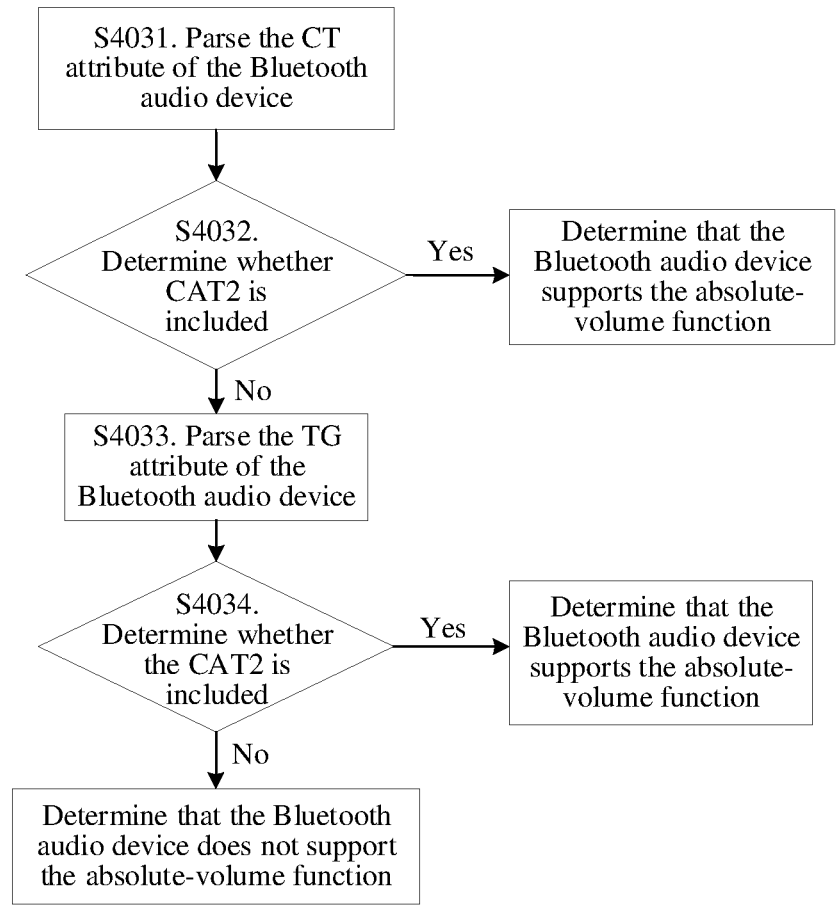
FIG. 5 is a schematic flowchart of another method for determining whether a device supports an absolute-volume function.

For a specific implementation process of determining, by the smart terminal according to the CT attribute and the TG attribute, whether the Bluetooth audio device supports an absolute volume, reference may be made to the schematic flowchart shown in FIG. 5. The process includes the following steps.

S4031: The smart terminal parses the CT attribute of the Bluetooth audio device.

S4032: The smart terminal determines whether the CT attribute includes CAT2 information. If so, it is determined that the Bluetooth audio device supports the absolute volume, and if not, step S4033 is performed.

S4033: The smart terminal parses the TG attribute of the Bluetooth audio device.

S4034: The smart terminal determines whether the TG attribute includes the CAT2 information. If so, it is determined that the Bluetooth audio device supports the absolute volume, and if not, it is determined that the Bluetooth audio device does not support the absolute volume.

It should be understood that according to the specification in the AVRCP, the CAT2 (category2) is used for indicating an audio Monitor/Amplifier (Monitor/Amplifier) of the device, and the device also supports the absolute volume when satisfying a condition of supporting the CAT2 (Category2: Monitor/Amplifier). Therefore, it may be identified, by determining whether the TG attribute of the device includes the CAT2, whether the device supports the absolute volume.

However, in combination with the flow shown in FIG. 5, it can be seen that a method for identifying the absolute volume corresponding to the method is: first determining whether the CT attribute includes the CAT2 information: if so, determining that the Bluetooth audio device supports the absolute volume; and if not, further determining whether the TG attribute includes the CAT2 information. It should be understood that according to the method, if the CT attribute includes the CAT2 information, it is directly determined that the Bluetooth audio device supports the absolute volume (that is, whether the TG attribute includes the CAT2 information is not considered). But in fact, the CT attribute includes the capability supported by the Bluetooth audio device when serving as the CT role. The CT attribute includes the CAT2, which may indicate that the Bluetooth audio device supports the absolute volume when serving as the CT role, but it does not indicate that the Bluetooth audio device supports the absolute volume when serving as the TG role. However, in the absolute-volume scenario, the TG role is required to have the absolute-volume function, and whether the CT role supports the absolute volume is not critical. Therefore, in the method for determining the absolute volume shown in FIG. 5, a high possibility that an identification error occurs exists. As a result, the smart terminal is incapable of successfully adjusting the volume of the Bluetooth audio device by using the absolute-volume function subsequently, which seriously affects user experience.

Since at an early stage of application of the absolute-volume function, only a small number of specific Bluetooth audio devices support the function, and the absolute-volume function of the device is generally disabled by default in the developer option, even if the absolute volume of the device is incorrectly identified by using the above method, the user may not perceive the error. However, with the development of science and technology, increasingly more and more Bluetooth audio devices have the absolute-volume function. In addition, as the collaborative work among various devices is increasingly more widely used, the method for adjusting the volume of the Bluetooth audio device by using the smart terminal is more widely applied in life and work of the user. Therefore, improving accuracy of determining whether the Bluetooth audio device supports the absolute volume becomes a key to effectively adjusting the volume of the Bluetooth audio device and improving user experience.

In view of the above problems and current usage requirements of the user, embodiments of this application provide a volume management method and an electronic device. In the method, it is determined, mainly by parsing a TG attribute of a Bluetooth audio device, whether the TG attribute includes CAT2 information, to accurately identify whether the Bluetooth audio device supports an absolute volume attribute. In addition, for the Bluetooth audio device that supports an absolute volume, an absolute-volume switch control convenient for direct control by the user is set on a corresponding smart terminal interface. In this way, the user can independently and flexibly set an absolute-volume switch state of a specific Bluetooth audio device, so as to satisfy personalized usage requirements of the user for the absolute-volume functions of different Bluetooth audio devices.

Figure 6:
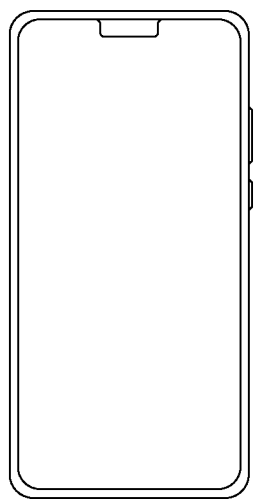
FIG. 6 is a schematic diagram of a system architecture to which a volume management method is applicable according to an embodiment of this application.
Figure 6:
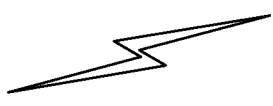
Figure 6:
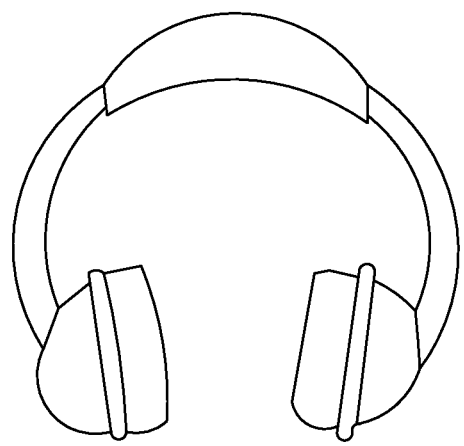

For example, as shown in FIG. 6, FIG. 6 is a schematic diagram of a system architecture of a volume management method according to an embodiment of this application. The technical solution of the embodiments of this application may be specifically implemented in the system architecture shown in FIG. 6 by using an example or a similar system architecture. As shown in FIG. 6, the system architecture may include a smart terminal 100 and a Bluetooth audio device 200.

In some embodiments, the smart terminal 100 may be specifically implemented as various types of electronic devices, for example, devices such as a smart phone, a tablet computer (PAD), a personal computer (personal computer, CP), and the like that have a volume adjustment function. The Bluetooth audio device 200 may be, for example, a device such as a Bluetooth headset, a Bluetooth speaker, a large-screen device, an onboard device, a smart wearable device, or the like that supports a Bluetooth function and an audio output function. This application does not limit a specific type of the smart terminal and a specific type of the Bluetooth audio device.

In some embodiments, a connection may be established between the smart terminal and the Bluetooth audio device by using a wireless network (for example, a Bluetooth (Bluetooth) technology, including Bluetooth Classic and Bluetooth Low Energy (Bluetooth low energy, BLE)), and the like. The smart terminal may identify, according to attribute information (such as the TG attribute) of the Bluetooth audio device, whether the Bluetooth audio device supports the absolute volume. When the Bluetooth audio device supports the absolute volume, the smart terminal may adjust an output volume of the Bluetooth audio device by using the absolute-volume function.

Figure 7:
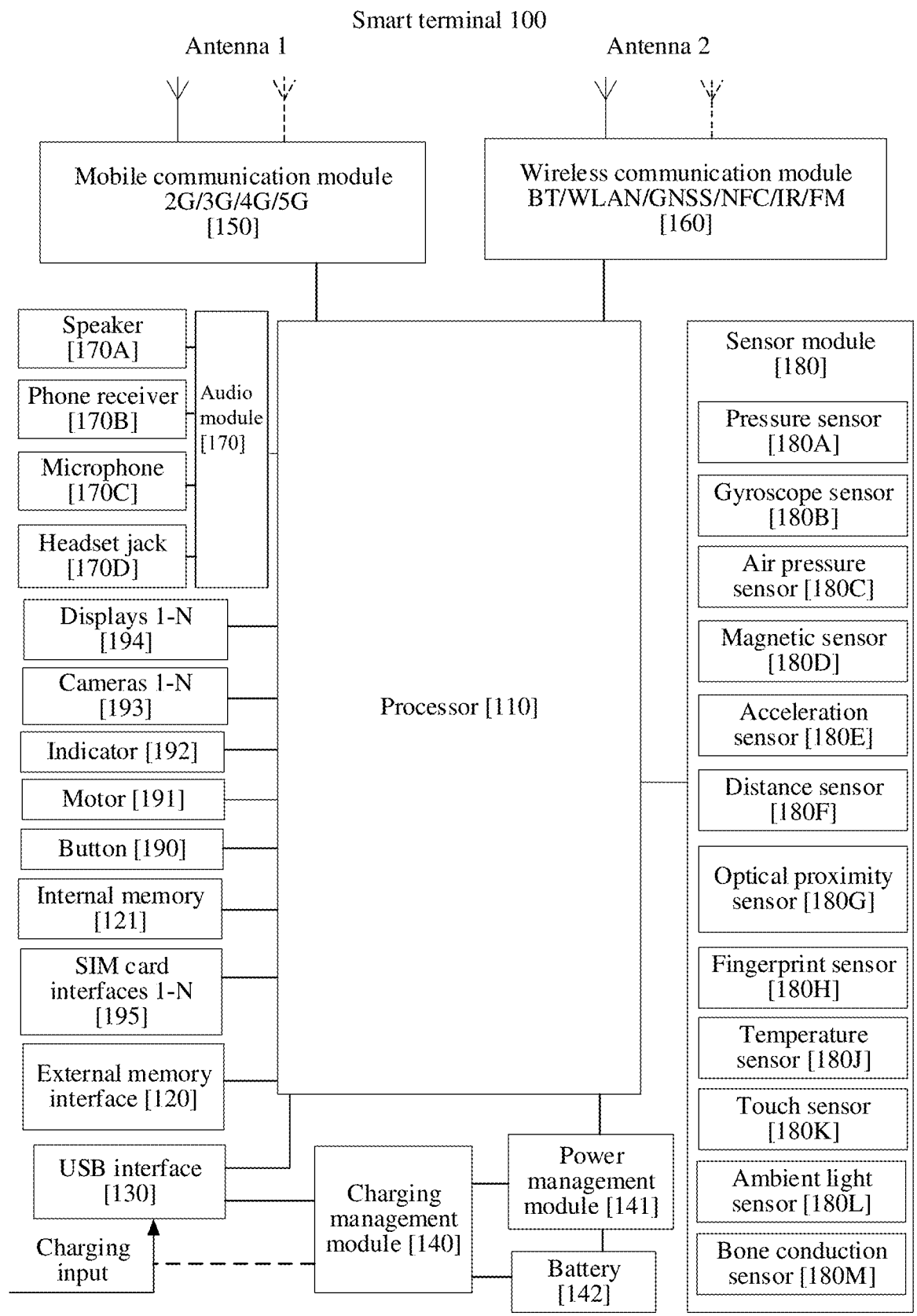
FIG. 7 is a schematic structural diagram of a smart terminal according to an embodiment of this application.

For example, as shown in FIG. 7, FIG. 7 is a schematic structural diagram of a smart terminal 100 according to an embodiment of this application. The smart terminal 100 may correspond to the smart terminal 100 in FIG. 6.

The smart terminal 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present invention does not constitute a specific limitation on the smart terminal 100. In some other embodiments of this application, the smart terminal 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the smart terminal 100. The controller may generate an operating control signal according to an instruction operation code and a sequence signal, to complete control of fetching and executing an instruction.

A memory may be further configured in the processor 110, to store an instruction and data. In some embodiments, the memory in the processor 110 is a cache memory. The memory may store an instruction or data that is recently used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the smart terminal 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the smart terminal 100. The processor 110 communicates with the display 194 by using a DSI interface, to implement a display function of the smart terminal 100.

The GPIO interface may be configured through software. The GPIO interface may be configured to transmit a control signal, or may be configured to transmit a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the smart terminal 100, or may be used for data transmission between the smart terminal 100 and a peripheral device. The USB interface 130 may also be connected to a headset to play audios through the headset. The interface may alternatively be configured to connect to another terminal such as an AR device. It may be understood that an interface connection relationship between the modules illustrated in this embodiment of the present invention is merely an example for description, and does not constitute a limitation on a structure of the smart terminal 100. In some other embodiments of this application, the smart terminal 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the smart terminal 100. The charging management module 140 may supply power to the terminal by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in the same device.

A wireless communication function of the smart terminal 100 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the smart terminal 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the smart terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some functional modules of the mobile communication module 150 may be configured in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The AP outputs a sound signal through an audio device (which is not limited to the speaker 170A, the phone receiver 170B, and the like), or displays an image or a video through the display 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the smart terminal 100. The wireless communication module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the smart terminal 100 are coupled, and the antenna 2 and the wireless communication module 160 of the smart terminal 100 are coupled, so that the smart terminal 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS) and/or satellite-based augmentation systems (SBAS).

The smart terminal 100 implements a display function by using the GPU, the display 194, the AP, and the like. The display 194 is configured to display an image, a video, and the like.

The smart terminal 100 may implement a photographing function by using the ISP, the camera 193, the video codec, the GPU, the display 194, the AP, and the like.

The DSP is configured to process a digital signal, and may further process another digital signal in addition to a digital image signal. For example, when the smart terminal 100 performs frequency selection, the DSP is configured to perform Fourier transform and the like on frequency energy. The video codec is configured to compress or decompress a digital video. The NPU is a neural-network (neural-network, NN) computing processor, quickly processes input information by referring to a structure of a biological neural network, for example, a transmission mode between neurons in a human brain, and may further continuously perform self-learning.

The external memory interface 120 may be configured to connect to an external storage card, for example, a micro SD card, to expand a storage capability of the smart terminal 100. The external storage card communicates with the processor 110 by using the external memory interface 120, so as to implement a data storage function, such as storing a file such as a music or a video in the external storage card.

The internal memory 121 may be configured to store computer executable program code, and the executable program code includes instructions.

The smart terminal 100 may implement an audio function by using the audio module 170, the speaker 170A, the phone receiver 170B, the microphone 170C, the headset jack 170D, the application processor, and the like, for example, music playback or recording.

The pressure sensor 180A is configured to sense a pressure signal, and may convert the pressure signal into an electrical signal. The gyroscope sensor 180B may be configured to determine a motion posture of the smart terminal 100. A magnetic sensor 180D includes a Hall sensor. The smart terminal 100 may detect opening and closing of a flip leather cover by using the magnetic sensor 180D. The acceleration sensor 180E may detect acceleration values of the smart terminal 100 in all directions (generally in three axes). When the smart terminal 100 is stationary, a magnitude and a direction of gravity may be detected. The acceleration sensor may be further configured to recognize a posture of the terminal, and is applied to an application such as switching between landscape orientation and portrait orientation or a pedometer. The optical proximity sensor 180G may include, for example, a light-emitting diode (LED) and an optical detector such as a photodiode. The light emitting diode may be an infrared light emitting diode. The smart terminal 100 may emit infrared light by using the light-emitting diode. The ambient light sensor 180L is configured to sense luminance of ambient light. The smart terminal 100 may adaptively adjust a luminance of the display 194 according to perceived brightness of the ambient light. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The bone conduction sensor 180M may obtain a vibration signal.

In addition, the smart terminal 100 further includes a barometric pressure sensor 180C and a distance sensor 180F. The barometric pressure sensor 180C is configured to measure an air pressure. In some embodiments, the smart terminal 100 calculates an altitude by using the air pressure value measured by the barometric pressure sensor 180C, and assists positioning and navigation.

The distance sensor 180F is configured to measure a distance. The smart terminal 100 may measure the distance by infrared or laser. In some embodiments, during shooting of a scene, the smart terminal 100 may perform ranging by using the distance sensor 180F, to achieve fast focusing.

Figure 8:
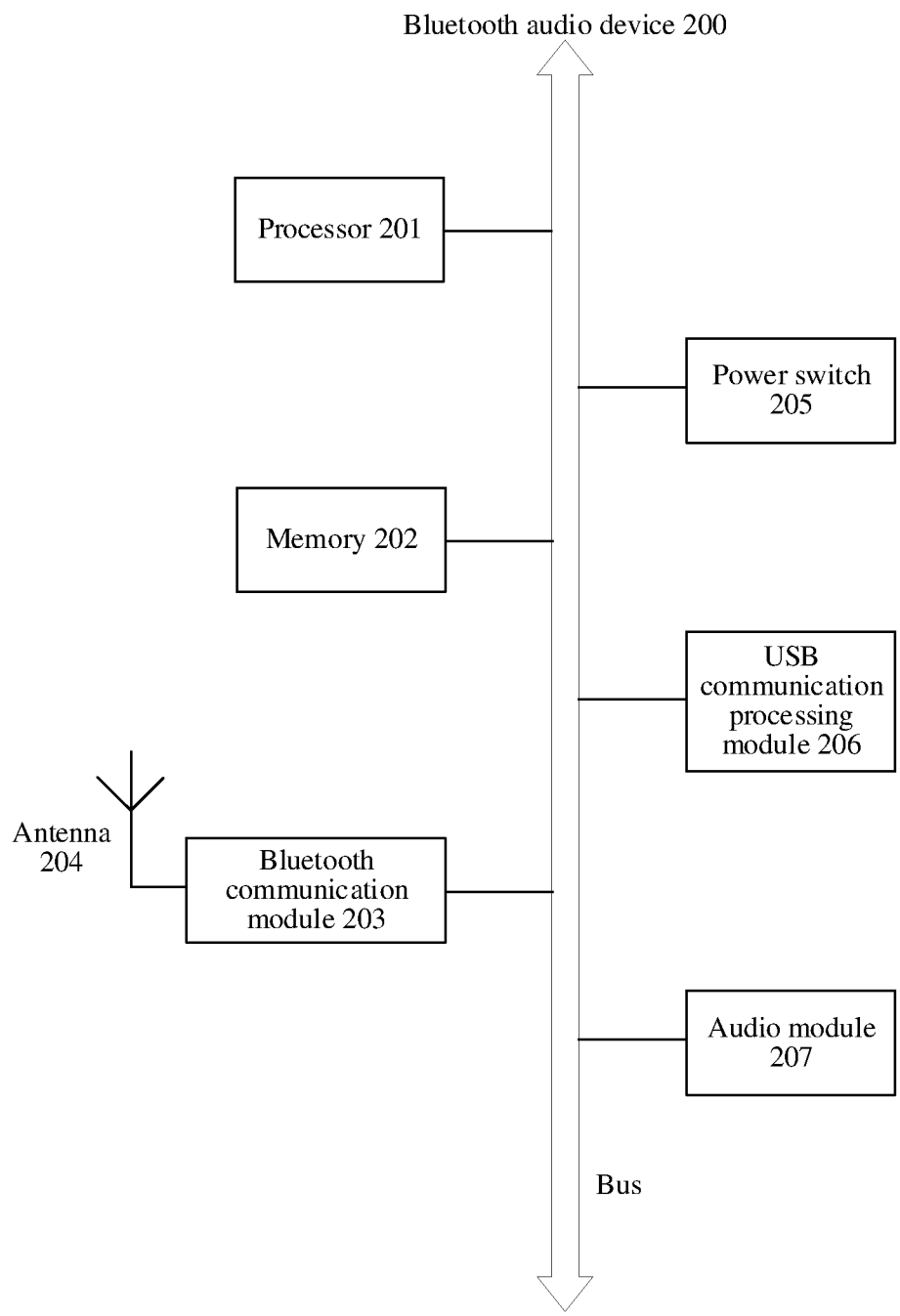
FIG. 8 is a schematic structural diagram of a Bluetooth audio device according to an embodiment of this application.

For example, as shown in FIG. 8, FIG. 8 is a schematic structural diagram of a Bluetooth audio device 200 according to an embodiment of this application. The Bluetooth audio device 200 may correspond to the Bluetooth audio device 200 shown in FIG. 6.

It should be understood that a structure of the Bluetooth audio device 200 shown in FIG. 8 is only an example. In actual application, the Bluetooth audio device 200 may have more or fewer components than that shown in FIG. 8, may have a combination of two or more components, or may have different component configurations. Various components shown in the figure may be implemented in hardware including one or more signal processing circuits and/or application-specific integrated circuits, software, or a combination of hardware and software.

As shown in FIG. 8, the Bluetooth audio device 200 may include a processor 201, a memory 202, a Bluetooth communication module 203, an antenna 204, a power switch 205, a USB communication processing module 206, and an audio module 207.

The processor 201 may be configured to read and execute computer readable instructions. During specific implementation, the processor 201 may mainly include a controller, an arithmetic unit, and a register. The controller is mainly responsible for instruction decoding, and sending a control signal for operations corresponding to instructions. The arithmetic unit is mainly responsible for protecting a register operand and an intermediate operation result temporarily stored during execution of the instructions, and the like. During specific implementation, a hardware architecture of the processor 201 may be an application-specific integrated circuit (ASIC) architecture, a MIPS architecture, an ARM architecture, an NP architecture, or the like.

In some embodiments, the processor 201 may be configured to parse a signal received by the Bluetooth communication processing module 203, for example, a pairing mode modification request, an absolute volume inquiry request, and the like sent by the electronic device 100. The processor 201 may further be configured to perform a corresponding processing operation according to an analysis result, for example, generating a pairing mode modification response, identifying the absolute-volume function of the Bluetooth audio device, and the like.

The memory 202 is coupled to the processor 201, and is configured to store various software programs and/or a plurality of sets of instructions. In actual implementations, the memory 202 may include a high-speed random access memory, and may also include a non-volatile memory such as one or more magnetic disk storage devices, a flash memory device, or another non-volatile solid-state storage device. The memory 202 may store an operating system, for example, an embedded operating system such as uCOS, VxWorks, RTLinux, and the like. The memory 202 may further store a communication program. The communication program may be configured to communicate with the electronic device 100 or other devices.

The Bluetooth communication module 203 may include a Bluetooth Classic (BT) module and a Bluetooth Low Energy (BLE) module.

In some embodiments, the Bluetooth communication module 203 may acquire signals transmitted by other devices (such as the electronic device 100), such as a probe request signal, a scanning signal, and the like, may send a response signal, a scanning response, and the like, so that other devices (such as the smart terminal 100) may discover the Bluetooth audio device 200, and establishes a wireless communication connection with other devices (such as the smart terminal 100), and communicates with other devices (such as the smart terminal 100) by Bluetooth.

In some embodiments, the Bluetooth communication module 203 may also transmit a signal, such as broadcasting a BLE signal, so that other devices (such as the smart terminal 100) may discover the Bluetooth audio device 200, and establishes a wireless communication connection with other devices (such as the smart terminal 100), and communicates with other devices (such as the smart terminal 100) by Bluetooth.

The wireless communication function of the Bluetooth audio device 200 may be implemented by using the antenna 204, the Bluetooth communication module 203, a modem processor, and the like.

The antenna 204 may be configured to transmit and receive an electromagnetic wave signal. Each antenna in the Bluetooth audio device 200 may be configured to cover a single communication band or a plurality of communication bands.

In some embodiments, the Bluetooth communication module 203 may have one or more antennas.

The power switch 205 may be configured to control a power supply to supply power to the Bluetooth audio device 200.

The USB communication processing module 206 may be configured to communicate with other devices by using the USB interface (not shown in FIG. 8).

The audio module 207 may be configured to output an audio signal through an audio output interface, so that the Bluetooth audio device 200 can support audio playback. The audio module 207 may further be configured to receive audio data through an audio input interface. The Bluetooth audio device 200 may be a media player such as a Bluetooth headset.

In some embodiments, the Bluetooth audio device 200 may further include a display (not shown in FIG. 8). The display may be configured to display an image, prompt information, and the like. The display may be a liquid crystal display (liquid crystal display, LCD), an organic light-emitting diode (organic light-emitting diode, OLED) display, a flexible light-emitting diode (flexible light-emitting diode, FLED) display, a quantum dot light-emitting diode (quantum dotlight emitting diode, QLED) display, and the like.

In some embodiments, the Bluetooth audio device 200 may further include a serial interface such as an RS-232 interface. The serial interface may be connected to other devices, for example, an audio outgoing device such as a speaker, so that the Bluetooth audio device 200 and the audio outgoing device can cooperate to play an audio and a video.

A Bluetooth protocol framework that may be used by the smart terminal and the Bluetooth audio device is described below with reference to the accompanying drawings.

Figure 9:
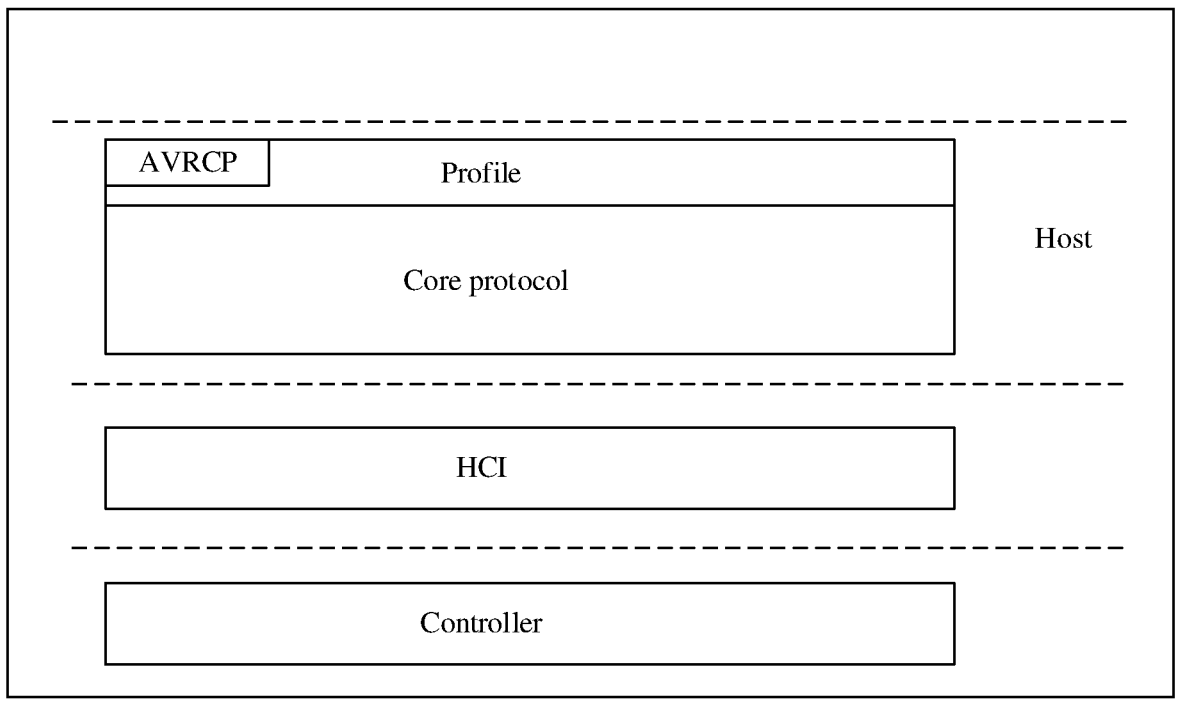
FIG. 9 is a schematic diagram of a Bluetooth protocol framework according to an embodiment of this application.

For example, as shown in FIG. 9, FIG. 9 is a schematic diagram of a Bluetooth protocol framework according to an embodiment of this application, which includes but is not limited to a Host (host) protocol stack, an HCl (Host Controller Interface), and a controller (Controller).

The Host protocol stack defines a plurality of profiles (profile) and core protocols (protocol) in the Bluetooth framework. Each profile defines a corresponding message format and an application rule, and the profile is a Bluetooth service (application). In order to realize interconnection and intercommunication of different devices on different platforms, the Bluetooth protocol formulates specifications for various possible and general-purpose application scenarios, such as an A2DP (advance audio distribution profile), an HFP (hands-free profile), and the audio/video remote control profile (audio/video remote control profile, AVRCP) in the embodiments of this application. The core protocol includes but is not limited to a basic Bluetooth service protocol (service discover protocol), a logical link control and adaptation protocol L2CAP (logical link control and adaptation protocol), and the like. The core protocol is essential for the Bluetooth protocol stack.

The HCl provides a unified interface to access a link manager and a unified way to access a baseband for upper layer protocols. Several transmission layers exist between the host core protocol stack and the controller. These transmission layers are transparent and configured to complete a task of data transmission. The Bluetooth Special Interest Group (Bluetooth special interest group, SIG) specifies four physical bus ways to connect with hardware, that is, four HCl transmission layers: a USB, a RS232, a UART, and a PC Card.

The Controller defines an underlying hardware part, including a radio frequency (RF), a baseband (BB), and a link manager (LM). The RF allows filtering and transmission of bit streams through a microwave at the unlicensed 2.4 GHz ISM band, and mainly defines conditions for a Bluetooth transceiver to operate normally in this band. The baseband is responsible for frequency hopping and transmission of Bluetooth data and an information frame. The link manager is responsible for connecting, establishing and disconnecting a link and performing security control. An LM (link manager) layer is a link manager protocol of the Bluetooth protocol stack, which is responsible for translating the upper-layer HCl command into an operation that can be received by the baseband, establishing an asynchronous connection-oriented link (asynchronous connection-oriented link, ACL) and a synchronous connection-oriented/extended (synchronous connection-oriented/extended, SCO), causing the Bluetooth audio device to enter an operating mode in a power-saving state, and the like. An LC (link control) layer is responsible for making responses to upper layer LM commands (such as establishing a data packet transmission link and maintaining the link) during transmission of a batch of data packets.

The method according to the embodiments of this application may be partially implemented by the wireless communication module 160 of the smart terminal 100 shown in FIG. 7 and the Bluetooth communication module 203 of the Bluetooth audio device 200 shown in FIG. 8. Specifically, the method may be performed by a Bluetooth module or a Bluetooth chip in the smart terminal 100 and the Bluetooth audio device 200.

In order to better understand the volume management method provided in the embodiment of this application, an exemplary process of pairing and connecting the smart terminal with the Bluetooth audio device is described below.

When the smart terminal is not paired with the Bluetooth audio device, after the smart terminal enables the Bluetooth function, the smart terminal may send an inquiry request (inquiry request) to the surroundings. When the Bluetooth audio device is in an inquiry scan (inquiry scan) state, the Bluetooth audio device may scan the inquiry request sent by the smart terminal. In response to the scanned inquiry request, the Bluetooth audio device may send an inquiry response (inquiry response) to the smart terminal, so that the smart terminal acquires the Bluetooth audio device as a pairable device option. After the user selects the device option of the Bluetooth audio device, the smart terminal may send a paging request (page request) to the Bluetooth audio device. The Bluetooth audio device may monitor the paging request of the electronic device at a certain modulation frequency within a fixed time window at a regular interval. After the paging request of the smart terminal is monitored, the Bluetooth audio device may send a slave paging response (salve page response) to the smart terminal in a next time slot. The smart terminal may send a master paging response (master page response) to the Bluetooth audio device in the next time slot after receiving the slave paging response from the Bluetooth audio device. Subsequently, after pairing authentication is performed on the Bluetooth audio device and the smart terminal, a Bluetooth connection for data transmission may be established.

It should be understood that, in some embodiments of this application, the smart terminal may manage the absolute volume of the Bluetooth audio device after accurately determining that a certain Bluetooth audio device supports the absolute volume. For example, a control to manage the absolute volume of the Bluetooth audio device is added to the interface. For example, as shown in FIG. 10A to FIG. 10D, FIG. 10A to FIG. 10D are schematic diagrams of some graphical user interfaces (graphical user interface, GUI) according to an embodiment of this application. An example that the smart terminal is a mobile phone and the absolute-volume control is set in the interface of a setting application of the mobile phone is used for description herein.

Figure 10A:
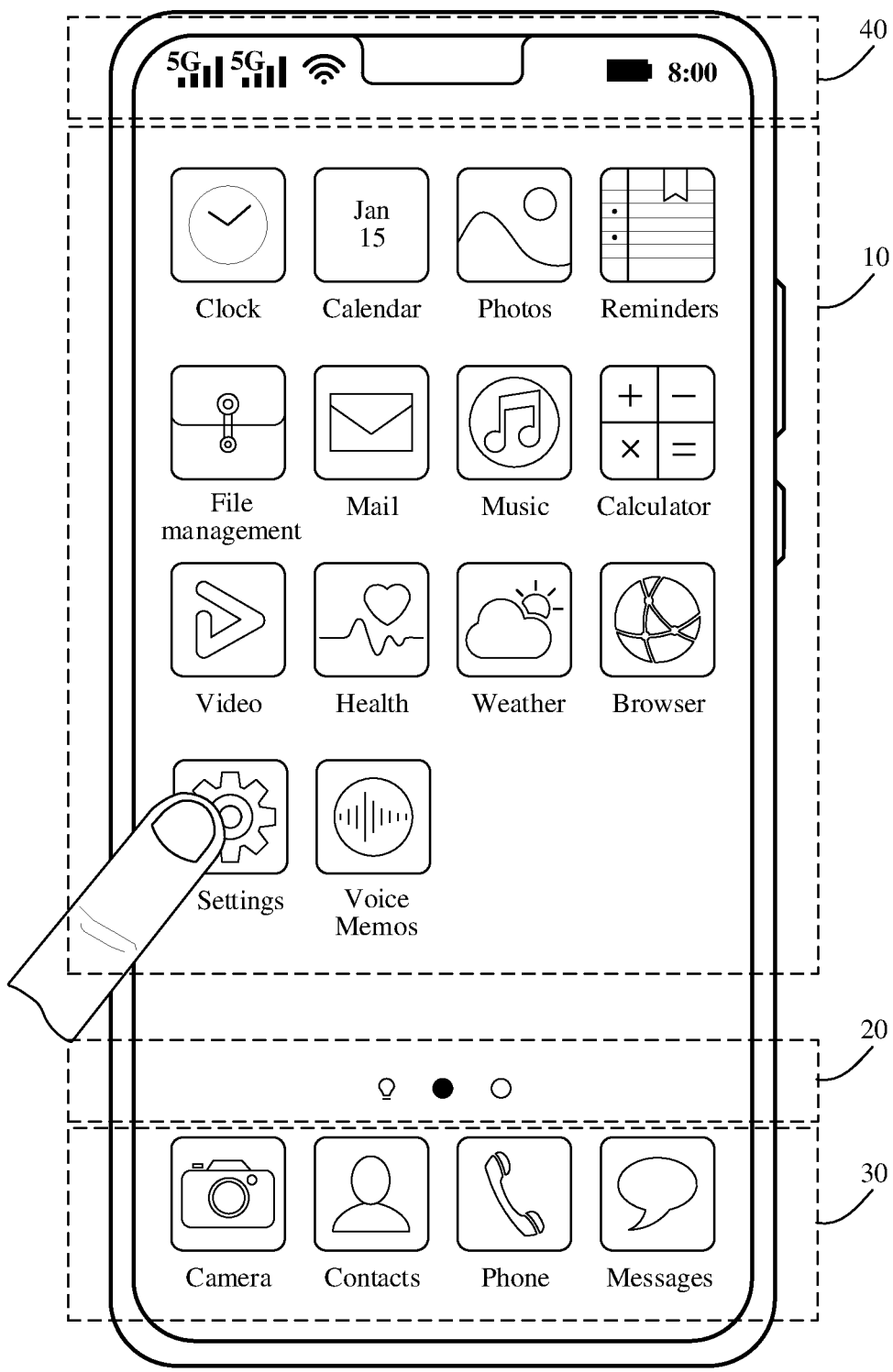
FIG. 10A to FIG. 10D are schematic diagrams of some graphical user interfaces according to an embodiment of this application.

For example, as shown in FIG. 10A, FIG. 10A is a schematic diagram of a home screen interface of a mobile phone. The home screen interface may include an application icon display area 10 configured to display various types of application (application, App) icons, such as a Clock icon, a Calendar icon, a Photos icon, a Reminders icon, a Files icon, a Mail icon, a Music icon, a Calculator icon, a Voice Memos icon, a Health icon, a Weather icon, a Browser icon, a Settings icon, and the like. A page indicator display area 20 may be provided below the plurality of application icons. A page indicator included in the area is used for indicating a positional relationship between a currently displayed page and other pages. A tray application icon display area 30 may be displayed below the page indicator, which is configured to display a plurality of tray application icons, for example, a Camera icon, a Contacts icon, a Phone icon, a Message icon, and the like. In some other embodiments, the home screen interface of the mobile phone may include more or fewer application icons or tray application icons than those shown in the figure, which is not limited in this application. A status bar 40 may further be displayed above the home screen interface. The status bar 40 may include one or more signal strength indicators of a mobile communication signal (or a cellular signal), one or more signal strength indicators for a wireless fidelity (wireless fidelity, Wi-Fi) signal, a battery indicator of the mobile phone, a time indicator, and the like.

In some embodiments, the mobile phone may receive a tapping operation of the user for the setting application icon. In response to the tapping operation of the user, the mobile phone may display a details setting interface shown in FIG. 10B.

Figure 10B:
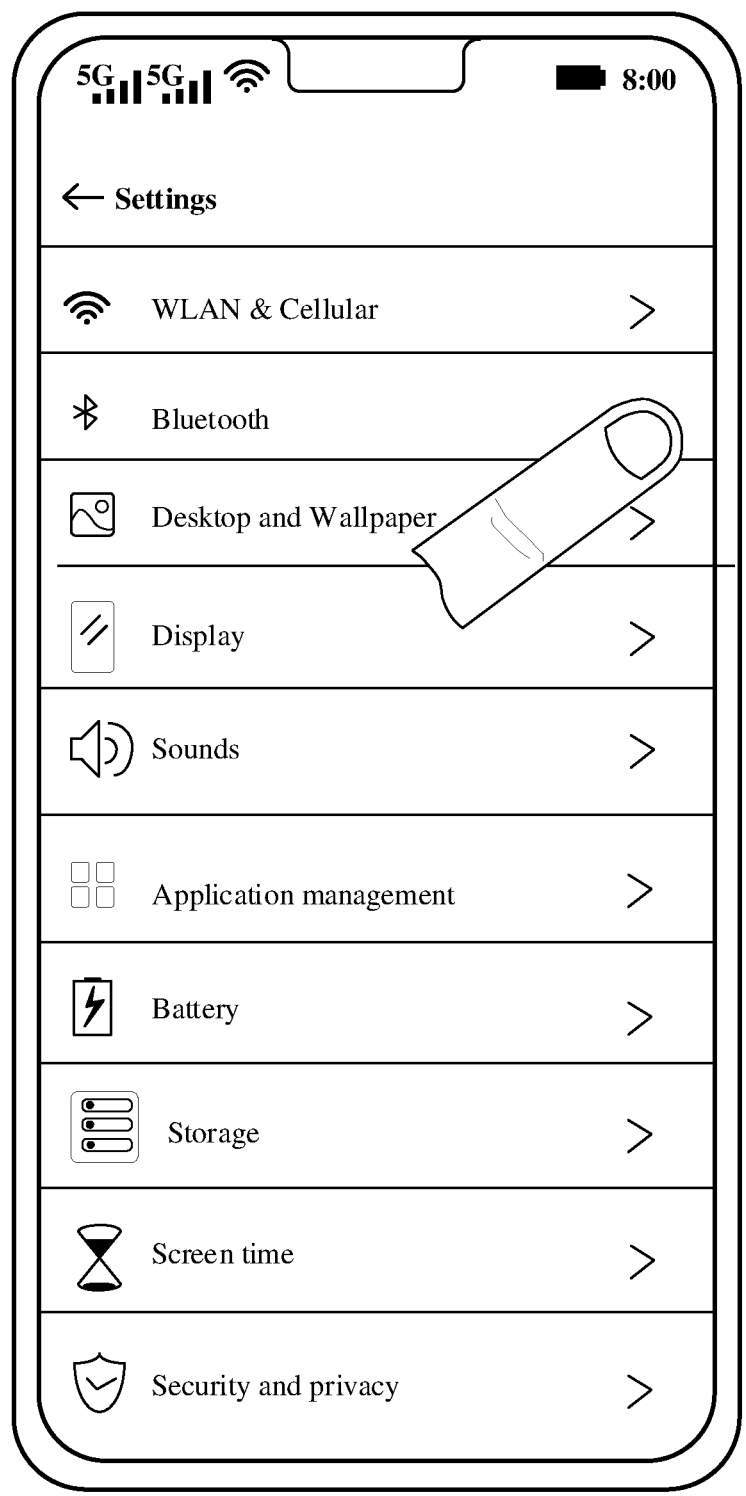

As shown in FIG. 10B, the details setting interface may include management bars for a plurality of services, for example, a management bar for WLAN & Cellular, a management bar for Bluetooth, a management bar for Desktop and Wallpaper, a management bar for Display, a management bar for Sounds, a management bar for Applications, a management bar for Battery, a management bar for Storage, a management bar for Screen time, a management bar for Security and Privacy, and the like. In actual application, the setting interface may further include more or fewer types of management bars than those shown in the figure, which is not limited in this application.

In some embodiments, the mobile phone may receive the tapping operation of the user on the management bar for Bluetooth. In response to the tapping operation of the user, the mobile phone may display a Bluetooth management interface shown in FIG. 10C.

Figure 10C:
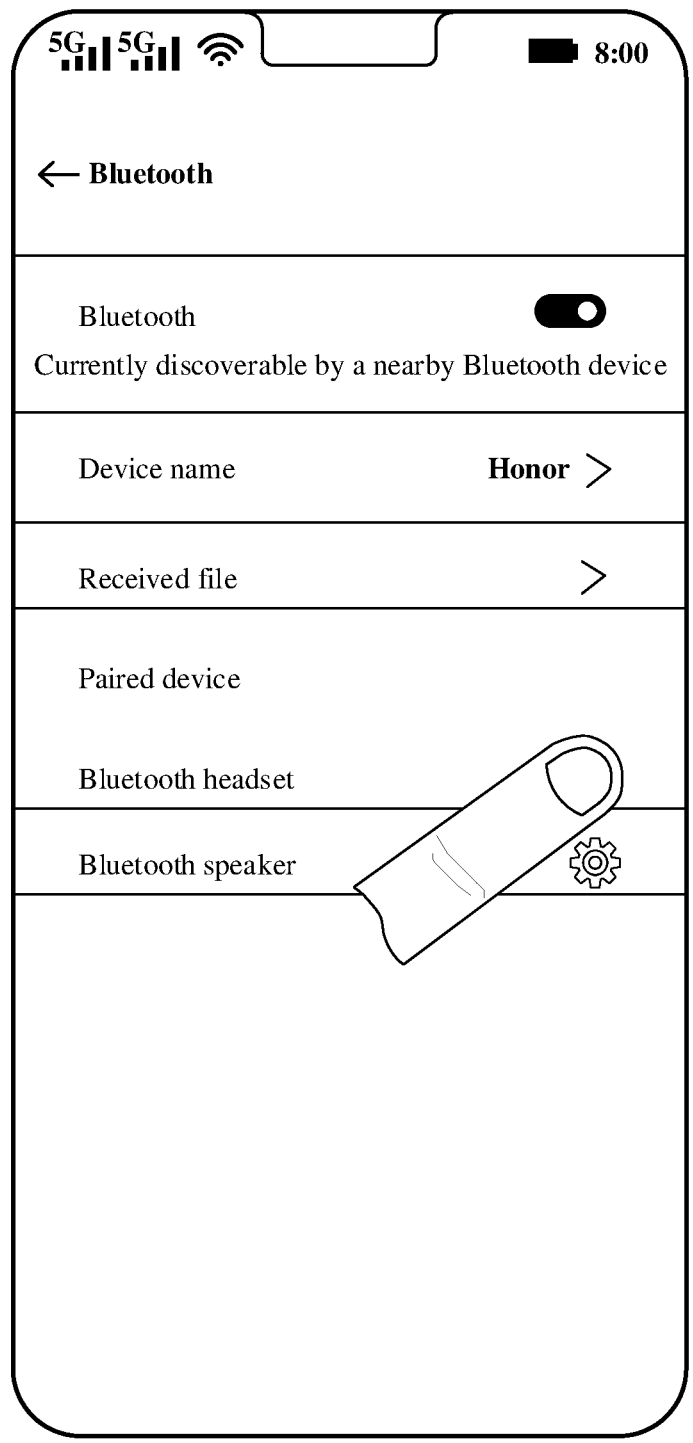

As shown in FIG. 10C, the Bluetooth management interface may include a plurality of Bluetooth function management bars, for example, a management bar for Bluetooth on/off, a management bar for Bluetooth device name, a management bar for Received file by Bluetooth, and a management bar for Paired device. The management bar for Bluetooth on/off is configured to control the on or off status of the Bluetooth function. When the Bluetooth function is enabled, the management bar for Bluetooth on/off may further display prompt information indicating that the Bluetooth function is enabled. For example, the mobile phone is currently discoverable by a nearby Bluetooth device, and the like. The management bar for Bluetooth device name may be configured to set or change a name of the mobile phone discoverable as a Bluetooth device by other devices, for example, the current name is Honor. The management bar for Received file may be configured to manage the files received by the mobile phone by Bluetooth. For example, the management bar for Paired device may include, for example, one or more Bluetooth audio devices (or other types of Bluetooth devices) with which the mobile phone has been paired, such as the Bluetooth headset (for example, AirPods) and a Bluetooth speaker shown in FIG. 10C. The management bar for Paired device may be configured to manage a Bluetooth audio device with which the mobile phone has been paired.

In some embodiments, the mobile phone may receive the tapping operation of the user on the management bar for Paired Bluetooth headset. In response to the tapping operation of the user, the mobile phone may display a management interface of the paired Bluetooth headset shown in FIG. 10D.

Figure 10D:
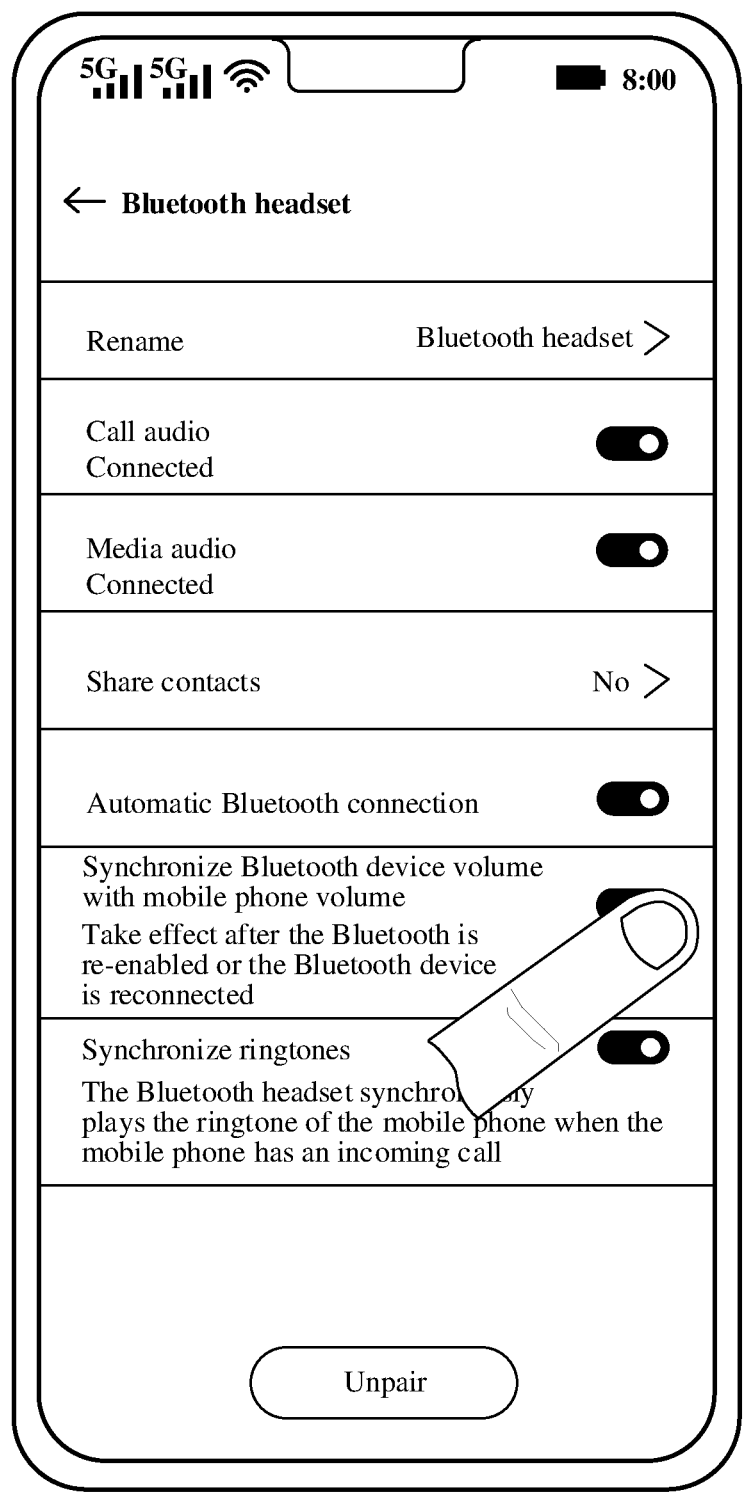

As shown in FIG. 10D, the management interface of the paired Bluetooth headset may include a plurality of management bars, for example, a management bar for Rename, a management bar for Call audio connection, a management bar for Media audio connection, a management bar for Share contacts, a management bar for Automatic Bluetooth connection, a management bar for Synchronize Bluetooth device volume with mobile phone volume, or a management bar for Synchronize ringtones. The management bar for Rename is used by the user to change the name of the Bluetooth headset. The management bar for Call audio connection and the management bar for Media audio connection are respectively configured to set a call audio connection status and a media audio connection status when the Bluetooth headset is connected to the mobile phone. The management bar for Share contacts is configured to set whether to allow sharing contact information in the mobile phone with the Bluetooth headset. The management bar for Automatic Bluetooth connection is configured to set whether to allow the mobile phone to automatically connect to the Bluetooth headset when the Bluetooth function of the mobile phone is enabled. The management bar for Synchronize ringtones is configured to set whether to allow the Bluetooth headset to synchronously play the mobile phone ringtone when the mobile phone has an incoming call. The management bar for Synchronize Bluetooth device volume with mobile phone volume is configured to set whether to use the absolute-volume function to associate the mobile phone volume with the volume of the Bluetooth headset. The management bar for Synchronize Bluetooth device volume with mobile phone volume may further include description information for displaying the function, such as taking effect after the Bluetooth is re-enabled or the Bluetooth device is reconnected, so that the user can better understand when the function starts to be realized after the control is enabled.

In some embodiments, the mobile phone may receive an operation of enabling a switch control by the user for synchronization of the volume of the Bluetooth device with the volume of the mobile phone. In response to the operation of enabling the function of synchronizing the volume of the Bluetooth device with the volume of the mobile phone, the mobile phone may synchronously adjust the volume of the Bluetooth headset during adjustment of the volume of the mobile phone. That is to say, in this case, a volume slider of the mobile phone is linked with a volume slider of the Bluetooth headset, so that the aural volume of the Bluetooth headset changes synchronously with a volume level of the mobile phone.

In some other embodiments, the mobile phone may receive a disabling operation of the switch control by the user for synchronization of the volume of the Bluetooth device with the volume of the mobile phone. In response to the disabling operation by the user, the mobile phone no longer adjusts the volume of the Bluetooth headset. That is to say, the volume adjustment of the mobile phone is independent of the volume adjustment of the Bluetooth headset, and the aural volume of the Bluetooth headset no longer changes synchronously with the change of the volume slider of the mobile phone.

Through the above method, the user may visually and conveniently, independently, and flexibly determine whether to adjust the volumes of different Bluetooth audio devices by using the method of the absolute volume, thereby satisfying personalized usage requirements of the user.

It should be understood that the above manner is only an example of managing an absolute volume of a specific Bluetooth audio device. In actual application, a plurality of management manners may further be set for the identified Bluetooth audio device that supports the absolute volume. For example, the user is caused to control an enabled state or a disabled state of the absolute volume of a certain Bluetooth audio device by using a physical button, or in the running process of the smart terminal, the absolute volume of the Bluetooth audio device is always kept on by default, and the like, which is not limited in the embodiment of this application.

Figure 11:
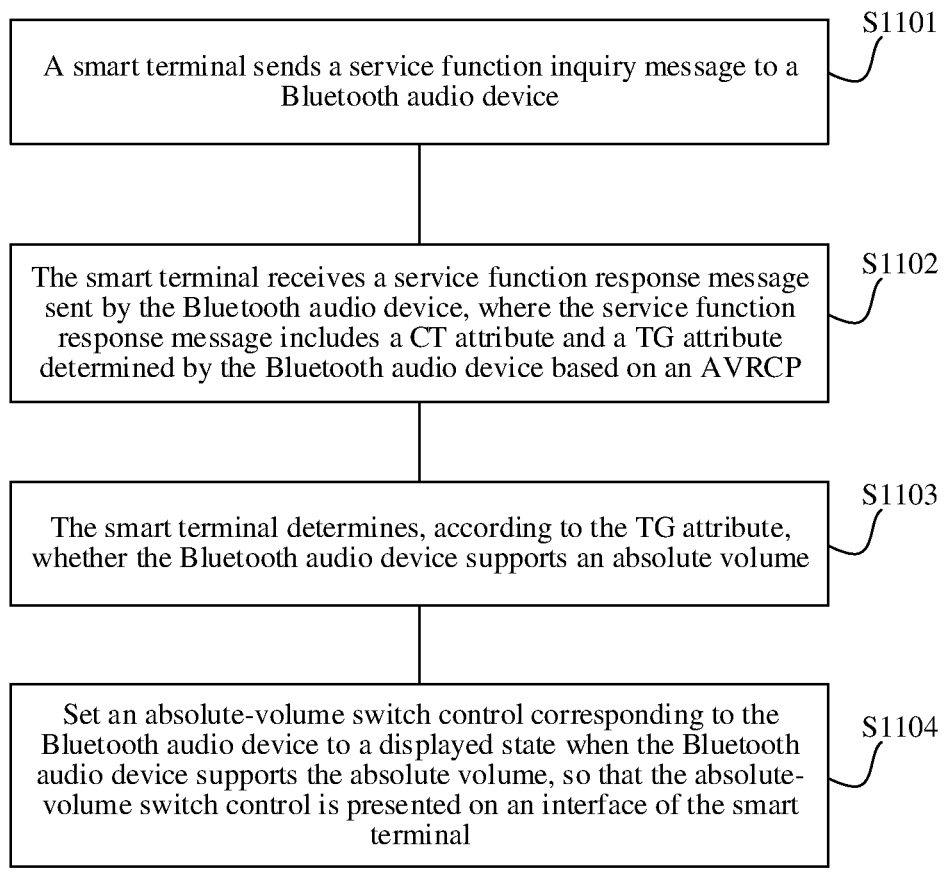
FIG. 11 is a schematic flowchart of a volume management method according to an embodiment of this application.

For example, as shown in FIG. 11, FIG. 11 is a schematic flowchart of a volume management method according to an embodiment of this application. The method may be performed by the smart terminal and the Bluetooth audio device. The method mainly includes the following steps.

S1101: A smart terminal sends a service function inquiry message to a Bluetooth audio device.

The service function inquiry message is used for inquiring a service function supported by the Bluetooth audio device. For example, the service function inquiry message may be an SDP service function inquiry message generated by the smart terminal based on a service discovery protocol (service discoveryprotocol, SDP). The SDP service function inquiry message is used for inquiring an A/V attribute from the Bluetooth audio device.

In some embodiments, after authentication is performed on the smart terminal and the Bluetooth audio device, before a service connection is established, the SDP may be started to inquire the service function of the Bluetooth audio device, so as to learn service functions that the Bluetooth audio device supports. Specifically, the smart terminal may first establish an L2CAP dynamic channel before inquiring the Bluetooth audio device by using the SDP service function inquiry message, and then sends the SDP service function inquiry message by using the L2CAP dynamic channel to inquire the service function of the Bluetooth audio device.

S1102: The smart terminal receives a service function response message sent by the Bluetooth audio device, where the service function response message includes a CT attribute and a TG attribute of the Bluetooth audio device.

In some embodiments, the Bluetooth audio device may send the service function response message to the smart terminal in response to the service function inquiry message. The service function response message may include the service function supported by the Bluetooth audio device.

In some embodiments, the service function response message may be an SDP service function response message generated by the Bluetooth audio device based on the SDP. The Bluetooth audio device may send the SDP service function response message to the smart terminal by using the L2CAP dynamic channel.

In some embodiments, the service function response message sent by the Bluetooth audio device to the smart terminal may include CT attribute information and TG attribute information of the Bluetooth audio device. The CT attribute information and the TG attribute information of the Bluetooth audio device may include functions defined for a CT role and a TG role in the AVRCP. For example, some functions defined for the CT and the TG in the AVRCP are shown in Table 1. M represents a function required to be supported, O represents a function that is optionally supported, and C represents a function that is required to be supported under certain conditions (for details, see the AVRCP).

TABLE 1

|   | Feature | Support in CT | Support in TG |
|---|---------|---------------|---------------|
| 1 | Connection establishment for control | M | O |
| 2 | Connection release for control | M | M |
| 3 | Connection establishment for browsing | C9 | C7 |
| 4 | Connection release for browsing | C9 | C10 |
| 4 | AV/C Info commands | O | M |
| 5 | Category 1: Player/Recorder | C3 | C3 |
| 6 | Category 2: Monitor/Amplifier | C3 | C3 |
| ... | ... | ... | ... |

In some embodiments, when a certain service function is supported, the Bluetooth audio device may add an identifier of the service function to the service function response message. For example, the Bluetooth audio device supports connection establishment for control (Connection establishment for control) when serving as a role of the smart terminal in some other scenarios, and may add an identifier corresponding to the connection establishment for control to the CT attribute of the service function response message. For another example, in an absolute-volume scenario, if the Bluetooth audio device supports the Monitor/Amplifier, an identifier corresponding to CAT2 may be carried in the TG attribute of the service function response message.

It should be understood that the smart terminal may learn, according to the capability identifier carried in the service function response message, the functions that the Bluetooth audio device supports.

S1103: The smart terminal identifies, according to the TG attribute, whether the Bluetooth audio device supports an absolute volume.

In some embodiments, the smart terminal determines, depending on whether the TG attribute includes CAT2 information, whether the Bluetooth audio device supports the absolute volume. Specifically, it is determined that the Bluetooth audio device supports the absolute volume when the smart terminal detects that the TG attribute includes the CAT2 information. When the smart terminal detects that the TG attribute does not include the CAT2 information, it is determined that the Bluetooth audio device does not support the absolute volume.

Figure 12:
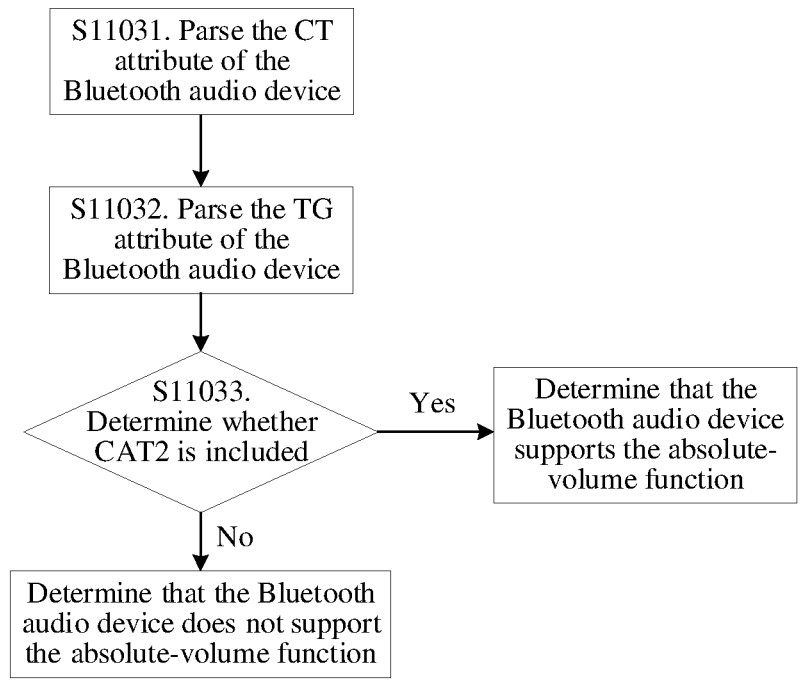
FIG. 12 is a schematic flowchart of another volume management method according to an embodiment of this application.

The process that how the smart terminal identifies, according to the TG attribute of the Bluetooth audio device, whether the Bluetooth audio device supports the absolute volume in the embodiment of this application is described with reference to the schematic flowchart shown in FIG. 12. For example, as shown in FIG. 12, FIG. 12 is a schematic flowchart of identifying an absolute volume of a Bluetooth audio device by a smart terminal according to an embodiment of this application, including the following steps.

S11031: The smart terminal parses the CT attribute of the Bluetooth audio device.

In some embodiments, after receiving the service function response message sent by the Bluetooth audio device, the smart terminal obtains the CT attribute information included in the service function response message, and then parses the CT attribute information to acquire capabilities supported by the Bluetooth audio device when serving as the CT role in some other scenarios.

For example, the information acquired by the smart terminal by parsing the CT attribute may include, for example, capabilities such as AVRCP version information, metadata (such as song information), file browsing information, and the like supported by the Bluetooth audio device when serving as the CT role in other scenarios.

It may be understood that the step is an optional step, and therefore the smart terminal may also parse the TG attribute first. The embodiment of this application does not limit an order of step S11031 and step S11032.

S11032: The smart terminal parses the TG attribute of the Bluetooth audio device.

In some embodiments, the smart terminal further parses the TG attribute of the Bluetooth audio device to acquire the capabilities supported by the Bluetooth audio device as the TG role after parsing the CT attribute.

For example, the information acquired by the smart terminal by parsing the TG attribute may include, for example, capabilities such as connection establishment control (Connection establishment control), connection establishment browsing (Connection establishment browsing), and the like that are supported by the Bluetooth audio device when serving as the TG role (in the absolute-volume scenario).

In some embodiments, it may be determined that the Bluetooth audio device supports the absolute-volume function when the smart terminal detects that the TG attribute of the Bluetooth audio device includes the CAT2 information. When the smart terminal detects that the TG attribute of the Bluetooth audio device does not include the CAT2 information, it may be determined that the Bluetooth audio device does not support the absolute-volume function.

It should be understood that by determining whether the TG attribute of the Bluetooth audio device includes the CAT2 information, the smart terminal can accurately identify whether the Bluetooth audio device has the absolute-volume function, so as to avoid the problem of failure to adjust the volume of the Bluetooth audio device due to an error in identifying the absolute-volume function of the Bluetooth audio device.

In some embodiments, the smart terminal may set a management function for the absolute volume of the Bluetooth audio device after accurately determining that the Bluetooth audio device supports the absolute volume. For example, the smart terminal may add an absolute-volume switch control corresponding to the Bluetooth audio device, set a function that causes the user to control the absolute volume of the Bluetooth audio device by using a physical button, or the like. In some other embodiments, the absolute volume corresponding to the Bluetooth audio device may further be enabled by default after the smart terminal accurately identifies that the Bluetooth audio device supports the absolute volume. Alternatively, during the running of the smart terminal, the absolute volume corresponding to the Bluetooth audio device may be always in an enabled state by default.

Optionally, the embodiment of this application may further include step S1104 of setting an absolute-volume switch control corresponding to the Bluetooth audio device to a displayed state when it is determined that the Bluetooth audio device supports the absolute volume, so that the absolute-volume switch control is presented on an interface of the smart terminal.

The displayed state in the embodiment of this application is relative to a hidden state, which may be understood that a switch control corresponding to the Bluetooth audio device can be intuitively presented to a user on a smart terminal interface.

In some embodiments, when the smart terminal is successfully paired with the Bluetooth audio device, the smart terminal may create a configuration file corresponding to the Bluetooth audio device, and store relevant information of the Bluetooth audio device in the configuration file, such as a device identifier of the Bluetooth audio device, a MAC address, and the like. In the embodiment of this application, description information related to the absolute volume of the Bluetooth audio device may also be stored in the configuration file, such as AVRCP version information (AVRCP version) supported by the Bluetooth audio device, absolute-volume identification information (such as ABSVolume), and the like.

Specifically, when the smart terminal and the Bluetooth audio device are initially paired and connected (or paired and connected again), the smart terminal may first store the acquired information of the Bluetooth audio device in the memory of the smart terminal. At this time, absolute-volume identification information of the Bluetooth audio device that is set by default in the memory indicates that the absolute volume is not supported (for example, an ABSVolume value is set to 3 in the memory). Then after the smart terminal accurately identifies, according to the method provided in the embodiment of this application, whether the Bluetooth audio device supports the absolute volume, the identification information (such as the ABSVolume) that accurately indicates the absolute volume is stored in the configuration file. For example, when the smart terminal accurately identifies that the Bluetooth audio device supports the absolute volume, the smart terminal may change the ABSVolume value in the memory to 1, and then store the value in the configuration file. Alternatively, when the smart terminal accurately identifies that the Bluetooth audio device does not support the absolute volume, the smart terminal may store the initially set ABSVolume value of 3 in the configuration file.

It should be understood that, in the embodiment of this application, only after the smart terminal accurately identifies that the Bluetooth audio device supports an absolute volume, the absolute-volume switch control corresponding to the Bluetooth audio device is set to the displayed state. For example, the absolute-volume switch control of the Bluetooth audio device may be displayed on the user interface. Before it is accurately identified whether the Bluetooth audio device supports the absolute volume (for example, during the initial pairing between the smart terminal and the Bluetooth audio device), since it cannot be determined that the Bluetooth audio device is bound to have the absolute-volume function, at this time, the absolute-volume identification information of the Bluetooth audio device is set to an unsupported state by default (for example, the ABSVolume value is set to 3). The absolute-volume switch control corresponding to the Bluetooth audio device is set to a No Display state. For example, the absolute-volume control is not displayed on the user interface by default. The above method can avoid causing interference to the accuracy of the absolute-volume identification information as a result of the user accidentally touching the absolute-volume switch control that is directly displayed before determining the accuracy of the absolute-volume function.

In some embodiments, the smart terminal may determine, depending on whether the Bluetooth audio device supports the absolute volume, whether to set the absolute-volume switch control corresponding to the Bluetooth audio device to the displayed state. For example, the smart terminal may generate the absolute-volume switch control corresponding to the Bluetooth audio device, and set the absolute-volume switch control corresponding to the Bluetooth audio device to the displayed state, when determining that the Bluetooth audio device supports the absolute volume. The smart terminal may not generate the absolute-volume switch control corresponding to the Bluetooth audio device when determining that the Bluetooth audio device does not support the absolute volume, and the absolute-volume switch control corresponding to the Bluetooth audio device is in a hidden state.

In an implementation, the smart terminal may receive a first operation inputted by the user, such as an operation of the user tapping a setting application icon, an operation of the user tapping the management bar for Bluetooth device, or the like. In response to the first operation, the smart terminal may determine, depending on whether the Bluetooth audio device supports the absolute volume, whether to display the switch control for the absolute volume. For example, the smart terminal may display, in response to the first operation, a first target interface when it is determined that the Bluetooth audio device supports the absolute volume. The first target interface includes the absolute-volume switch control corresponding to the Bluetooth audio device. Alternatively, the smart terminal may display, in response to the first operation, a second target interface when it is determined that the Bluetooth audio device does not support the absolute volume. The second target interface does not include the absolute-volume switch control corresponding to the Bluetooth audio device.

A specific process of determining, by the smart terminal depending on whether the Bluetooth audio device supports the absolute volume, whether to display the switch control for the absolute volume may include the following. When the user inputs the first operation to the smart terminal, the smart terminal is triggered to inquire the configuration file for the identification information (such as the ABSVolume value) of the absolute volume corresponding to the Bluetooth audio device. When the smart terminal determines, according to the identification information, that the Bluetooth audio device supports the absolute volume, it may be determined that the absolute-volume switch control is displayed on the interface, and then the smart terminal may display, to the user, the first target interface including the absolute-volume switch control. When the smart terminal determines, according to the identification information, that the Bluetooth audio device does not support the absolute volume, it may be determined that the absolute-volume switch control is hidden (that is, the absolute-volume control is not displayed to the user on the interface). Then the smart terminal may display, to the user, the second target interface that does not include the absolute-volume switch control.

The first operation of the user is tapping the setting application icon shown in FIG. 10A and the first target interface is a management interface of a Bluetooth headset shown in FIG. 10D by way of example. The above process is described more specifically.

When the mobile phone receives the operation of tapping the setting icon inputted by the user, an interface management module of the mobile phone may be triggered to inquire the configuration file for the absolute-volume identification information (such as the ABSVolume value) of the paired Bluetooth audio device (such as the Bluetooth headset and the Bluetooth speaker in FIG. 10D). In one case, assuming that the interface management module inquiries the configuration file for the ABSVolume value of 1 corresponding to the Bluetooth headset, it may be determined that the Bluetooth headset supports the absolute-volume function. Then the interface management module may display the management bar for Synchronize Bluetooth device volume with mobile phone volume in the Bluetooth headset management interface (the interface shown in FIG. 10D) under the setting application icon, and display the absolute-volume switch control in the management bar. When the user executes the operation of opening the management interface of the Bluetooth headset, the smart terminal may display, to the user, the interface including the absolute-volume switch control (the absolute-volume switch control may be presented in the management bar for Synchronize Bluetooth device volume with mobile phone volume), and then the user may enable the absolute volume of the Bluetooth headset or disable the absolute volume of the Bluetooth headset by tapping the switch control. In another case, assuming that the interface management module inquiries the ABSVolume value of 3 corresponding to the Bluetooth speaker (another device paired with the mobile phone), it may be determined that the Bluetooth speaker does not support the absolute-volume function. Then the interface management module may determine that the absolute-volume switch control of the Bluetooth speaker is hidden. That is to say, the management bar for Synchronize Bluetooth device volume with mobile phone volume and the control for controlling enabling/disabling of the absolute volume in the management bar are not displayed on the Bluetooth speaker management interface (not shown in FIG. 10A to FIG. 10D) under the setting application icon.

It should be understood that, in some embodiments, after the smart terminal is connected to the Bluetooth audio device, and before it is identified whether the Bluetooth audio device supports the absolute volume, the smart terminal may enable the absolute volume of the Bluetooth audio device by default. However, during the period, the smart terminal does not provide the function that allows the user to independently enable or disable the absolute volume. For example, before it is determined whether the Bluetooth audio device supports the absolute volume, the absolute-volume control of the Bluetooth audio device is not be displayed on the interface of the smart terminal. The method can avoid a failure of the volume adjustment and affecting user experience due to the operation of enabling or disabling the absolute volume executed by the user on the Bluetooth audio device that does not support the absolute volume.

In some embodiments, when the smart terminal determines, according to the absolute-volume identification information, that the Bluetooth audio device supports the absolute volume, it may further be detected whether the Bluetooth audio device is a device in a preset blacklist. When the Bluetooth audio device is not the device in the preset blacklist, the absolute-volume switch control corresponding to the Bluetooth audio device is generated, and the absolute-volume switch control is set to the displayed state. Relevant description of the blacklist is to be described in detail below, and the details will not be described herein.

In some embodiments, the smart terminal may further detect the device type of the Bluetooth audio device. When it is determined according to a detection result that the Bluetooth audio device is not an onboard device, the absolute-volume switch control corresponding to the Bluetooth audio device is set to the displayed state. A specific process that the smart terminal detects the device type of the Bluetooth audio device is to be described below, and the details will not be described herein.

In some embodiments, the smart terminal may receive, through the first target interface, an operation of enabling the absolute-volume control inputted by the user, and in response to the operation, the smart terminal may subsequently adjust the volume of the Bluetooth audio device through a change of the volume of the smart terminal. In some other embodiments, the smart terminal may receive, through the first target interface, an operation of disabling the absolute-volume control inputted by the user, and in response to the operation, the smart terminal and the Bluetooth audio device may independently control their own volume subsequently.

Figure 13A:
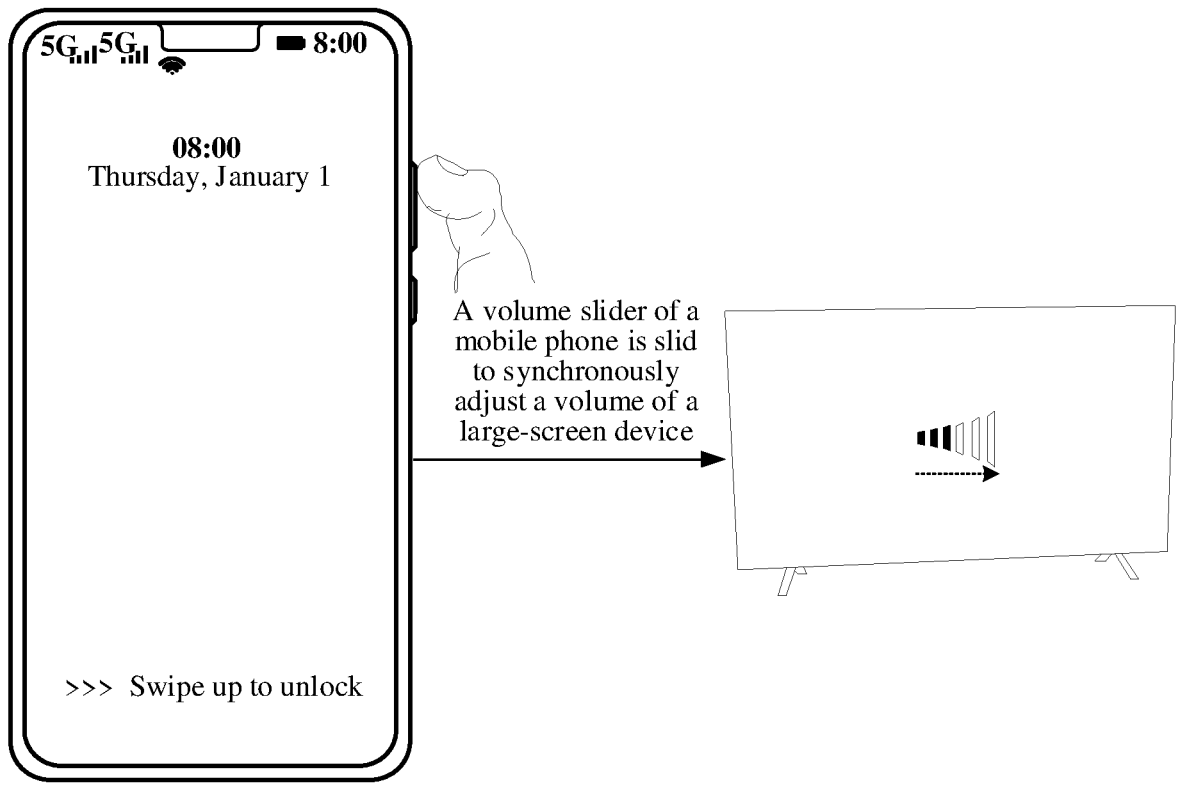
FIG. 13A to FIG. 13D are schematic diagrams of application scenarios of some volume management methods according to an embodiment of this application.
Figure 13B:
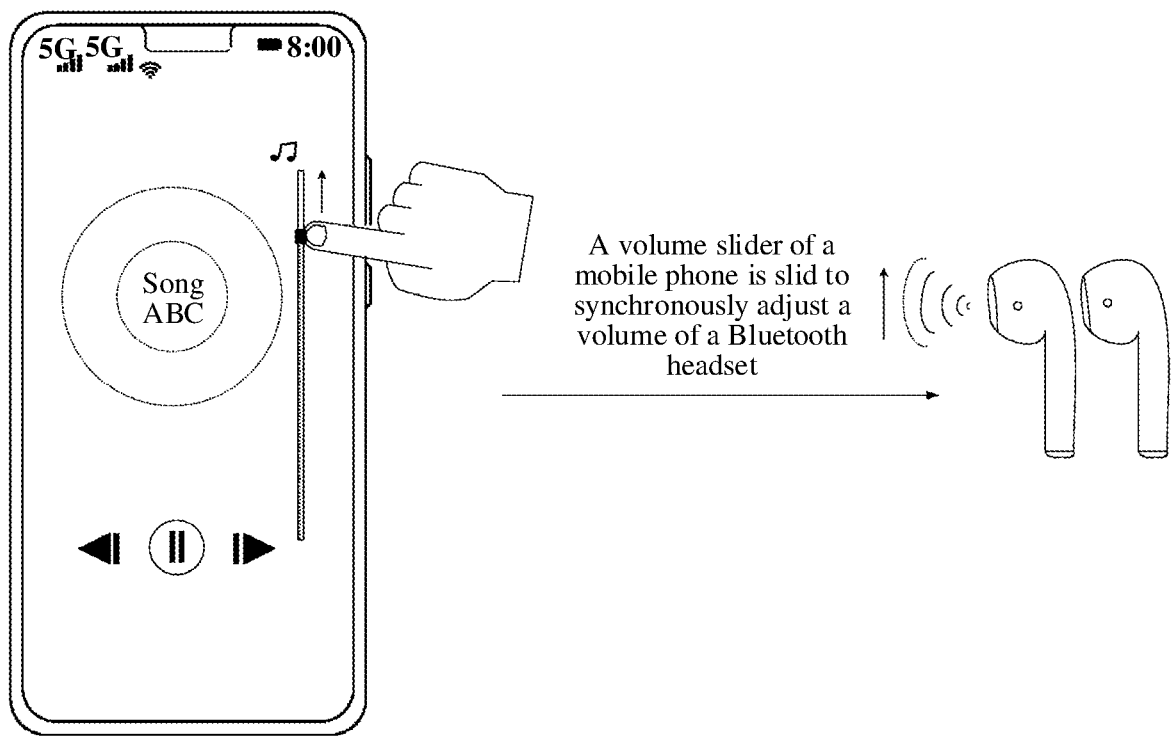
Figure 13C:
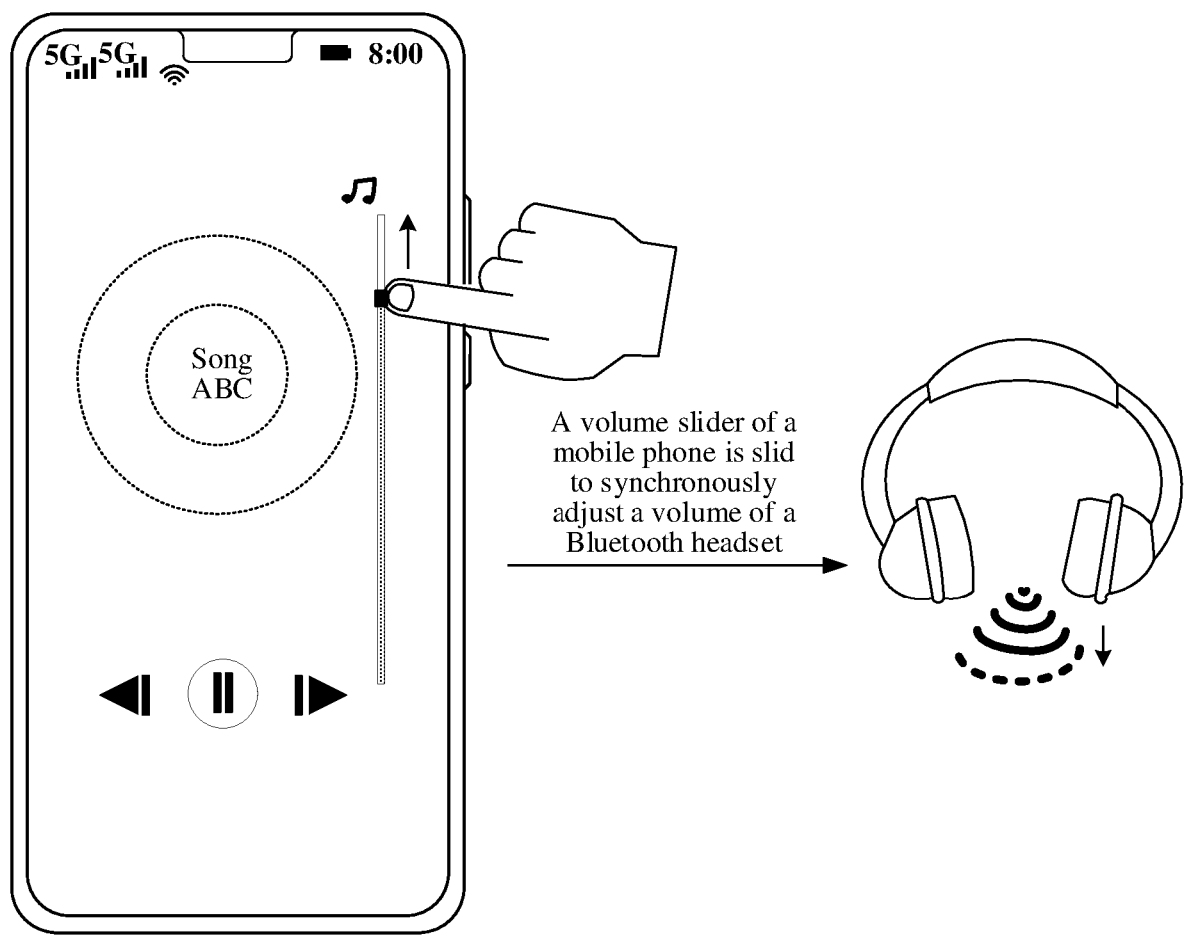
Figure 13D:
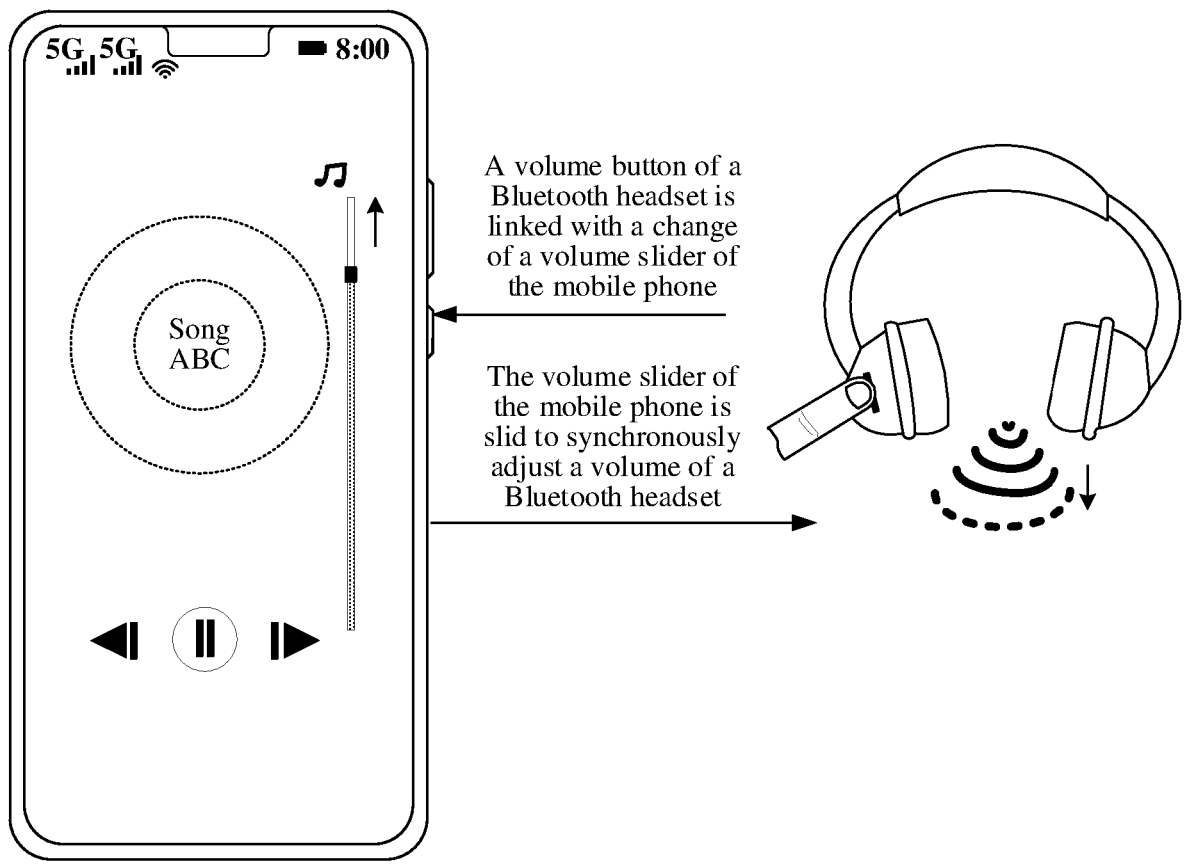

In some embodiments, for the Bluetooth audio device that supports the absolute volume, when the user inputs an operation of adjusting the volume to the smart terminal, the volume on the Bluetooth audio device changes synchronously with the volume adjustment of the mobile phone. For example, as shown in FIG. 13A, when the user presses the physical volume button on the mobile phone to increase the volume of the mobile phone, the volume of a large-screen device that is connected to the mobile phone via Bluetooth and whose absolute volume is enabled also synchronously increases. For another example, as shown in FIG. 13B, when the user slides the volume slider up on a playback interface of a song ABC on the mobile phone, the volume on the Bluetooth headset (such as AirPods) also synchronously increases. Assuming that the volume slider on the mobile phone displays 80% at this time, the volume of the headset is synchronized to 80%. In some other scenarios, the Bluetooth headset may also be a head-mounted Bluetooth headset shown in FIG. 13C, and a specific type of the Bluetooth headset is not limited in the embodiment of this application. In actual application, the user may further adjust the volume of the smart terminal in other ways to synchronously adjust the volume of the Bluetooth audio device. For example, as shown in FIG. 13D, the user may further adjust the volume control on the Bluetooth headset to link the volume slider on the mobile phone to change synchronously, and then the Bluetooth headset changes according to the volume state of the subscribed mobile phone, so that the volume of the Bluetooth headset changes synchronously with the change of the volume slider of the mobile phone, which is not limited in the embodiment of this application.

According to the volume management method provided in the embodiment of this application, an independent management function for the absolute volume of the Bluetooth audio device that supports the absolute-volume function is created on a user interface of the smart terminal. Therefore, it is convenient for the user to accurately control enabling or disabling of an absolute volume of a specific Bluetooth audio device, and personalized usage requirements of the user for the absolute-volume function of the specific Bluetooth audio device in different scenarios can be flexibly satisfied.

Figure 14:
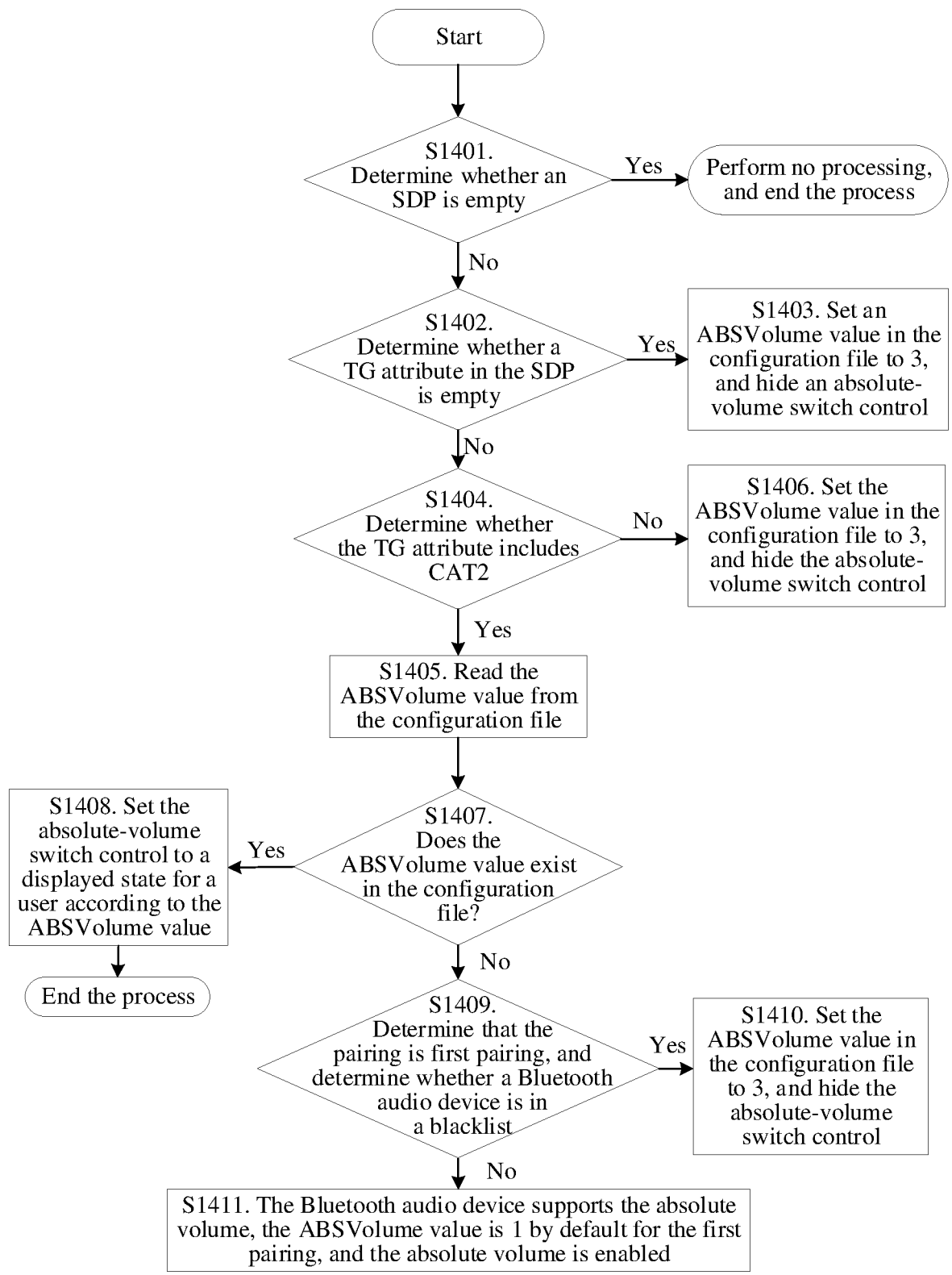
FIG. 14 is a schematic flowchart of still another volume management method according to an embodiment of this application.

For example, as shown in FIG. 14, FIG. 14 is a schematic flowchart of another volume management method according to an embodiment of this application. After the step of start, the process includes the following steps.

S1401: A smart terminal determines whether an SDP response message sent by a Bluetooth audio device is empty.

Before the step, the smart terminal may first send an SDP service function request message to the Bluetooth audio device to request to inquire a service function supported by the Bluetooth audio device.

In some embodiments, if it is determined that the SDP response message is empty, no step is performed, and the process ends. It should be understood that since the SDP response message is used for indicating the service function supported by the Bluetooth audio device, considering that in the actual situation, the Bluetooth audio device supports at least one service function, the SDP response message is not be empty. Therefore, if the SDP response message obtained by the smart terminal is empty, the connection between the smart terminal and the Bluetooth audio device is abnormal by default, such as connection interruption, and the like. At this point, no step is performed, and the process ends.

In some embodiments, if it is determined that the SDP response message is not empty, step S1402 may be performed.

S1402: The smart terminal determines whether a TG attribute in the SDP response message is empty.

It should be understood that some Bluetooth audio devices can only serve as the CT role, and may not serve as the role of Bluetooth audio device, and this type of Bluetooth audio device does not possess the TG attribute. When the Bluetooth audio device is this type of Bluetooth audio device, the SDP response message sent by the Bluetooth audio device to the smart terminal does not include the TG attribute, that is to say, the TG attribute in the SDP may be empty.

In some embodiments, when it is determined that the TG attribute in the SDP is empty (that is, when a determining result of the step is no), the smart terminal may perform step S1403. That is to say, the ABSVolume value corresponding to the Bluetooth audio device in the configuration file is set to 3, and the absolute-volume switch control is hidden.

The ABSVolume value may correspond to the identification information corresponding to the absolute volume of the Bluetooth audio device described in the embodiment of FIG. 8. In the embodiment of this application, a different ABSVolume value may be preset to respectively indicate whether the Bluetooth audio device supports the absolute volume. In the embodiment of this application, only the ABSVolume value set to 3 indicates that the absolute volume is not supported, and the ABSVolume value set to 1 indicates that the absolute volume is supported by way of example for description. In the actual application, other identifiers may further be used to respectively indicate whether the absolute volume is supported, which is not limited in the embodiment of this application.

In some embodiments, when it is determined that the TG attribute in the SDP is not empty (that is, when the determining result of the step is yes), step S1404 may be performed.

S1404: The smart terminal determines whether the TG attribute includes CAT2.

In some embodiments, when the smart terminal determines that the TG attribute does not include CAT2 (that is, when the determining result of the step is no), the smart terminal may perform step S1406. That is to say, the ABSVolume corresponding to the Bluetooth audio device in the configuration file is set to 3, and the absolute-volume switch control is hidden.

In some embodiments, when the smart terminal determines that the TG attribute includes CAT2 (that is, when the determining result of the step is yes), the smart terminal may perform step S1405.

S1405: The smart terminal executes an operation of reading the ABS Volume value from the configuration file.

The configuration file is a configuration file corresponding to the Bluetooth audio device. Relevant description information of the absolute volume of the Bluetooth audio device may be stored in the configuration file, for example, including at least AVRCP version information (AVRCP version) supported by the Bluetooth audio device, the absolute-volume identification information (such as the ABS Volume value), and the like.

S1407: The smart terminal determines whether the ABSVolume value exists in the configuration file.

In some embodiments, when the smart terminal determines that the ABSVolume value exists in the configuration file (that is, when the determining result of the step is yes), the smart terminal may perform step S1408 next. That is to say, the smart terminal may set, according to the ABSVolume value, a displayed state of the absolute-volume switch control for the user. Specifically, when the ABSVolume value is 1, the smart terminal may set the absolute-volume switch control to be in a visible state. That is to say, the management bar, the switch control, and the like of the absolute volume are presented to the user on the target interface of the smart terminal. When the ABSVolume value is 3, the smart terminal may set the absolute-volume switch to the hidden state. That is to say, the management bar and the switch control, and the like of the absolute volume are invisible on the interface of the smart terminal. When the displayed state of the absolute-volume switch control is set, the process ends. It may be understood that step S1408 is an optional step. The smart terminal may not display the switch control either.

In some embodiments, when the smart terminal determines that the ABSVolume value does not exist in the configuration file (that is, when the determining result of the step is no), the smart terminal may perform step S1409 next.

S1409: The smart terminal deems the Bluetooth audio device to be initially paired, and determines whether the Bluetooth audio device is in a blacklist.

The blacklist includes the Bluetooth audio device that supports the absolute volume but is not allowed to use the absolute volume. For example, the device in the blacklist may be manually added by a developer. For example, the developer may test the Bluetooth audio device that supports the absolute volume. If it is found that the synchronous volume adjustment of some Bluetooth audio devices does not achieve a desired effect (such as failure to synchronously adjust the volume of the Bluetooth audio device, or the power consumption is greater than a preset threshold), such Bluetooth audio devices may be manually added to the blacklist.

In some embodiments, the developer may add, for example, an identifier of the device that supports the absolute volume but does not achieve a desired volume synchronization effect, an identifier of a manufacturer corresponding to the device, a device model (model ID), or any combination of the information to the blacklist. In this way, the corresponding device is not allowed to use the absolute volume. In some embodiments, the server may deliver the blacklist to the smart terminal. Optionally, the server may further periodically update the device in the blacklist.

It should be understood that the device that supports the absolute volume but does not achieve a desired effect of the absolute volume is added to the blacklist, so as to avoid poor performance likely to be exhibited by such Bluetooth audio devices or poor user experience likely to be caused during synchronous adjustment of the volume of the Bluetooth audio device that does not have a desired test effect by using the absolute volume subsequently.

In some embodiments, when the smart terminal determines that the Bluetooth audio device is in the blacklist (that is, the determining result of the step is yes), the smart terminal may perform step S1410. That is to say, the ABS Volume corresponding to the Bluetooth audio device in the configuration file is set to 3, and the absolute-volume switch control is hidden.

In some embodiments, when the smart terminal determines that the Bluetooth audio device is not in the blacklist (that is, the determining result of the step is no), the smart terminal may perform step S1411.

S1411: The smart terminal determines that the Bluetooth audio device supports the absolute volume, and sets, on a basis of initial pairing with the Bluetooth audio device, the ABS Volume value corresponding to the Bluetooth audio device to 1 by default to enable the absolute volume.

In some embodiments, the smart terminal may enable the absolute volume of the Bluetooth audio device by default according to the ABSVolume value of 1 set by default. For example, the smart terminal may display the absolute-volume switch control on the target interface, and the switch control is in an enabled state by default.

According to the volume management method provided in the embodiment of this application, the smart terminal accurately identifies, according to Bluetooth audio device attribute information of the Bluetooth audio device, whether the Bluetooth audio device possesses the absolute-volume function. In addition, for the Bluetooth audio device that supports the absolute-volume function, a management function for the absolute volume of the Bluetooth audio device is created in an application. Therefore, it is convenient for the user to accurately manage the absolute-volume function of the Bluetooth audio device, and usage requirements of the user for the absolute-volume function of the specific Bluetooth audio device in different scenarios can be flexibly satisfied.

It should be understood that as the onboard device (or referred to as an in-vehicle infotainment) is increasingly more widely used, many onboard devices may also support the absolute volume. However, due to the non-standard design of a large number of onboard devices on the market, the performance of the onboard device in absolute-volume functions is uneven. Therefore, in order to cause the user to obtain an audio listening experience with a stable volume when using the onboard device, according to the volume management method provided in the embodiments of this application, the absolute volume of the Bluetooth audio device of an in-vehicle infotainment type is disabled.

Figure 15:
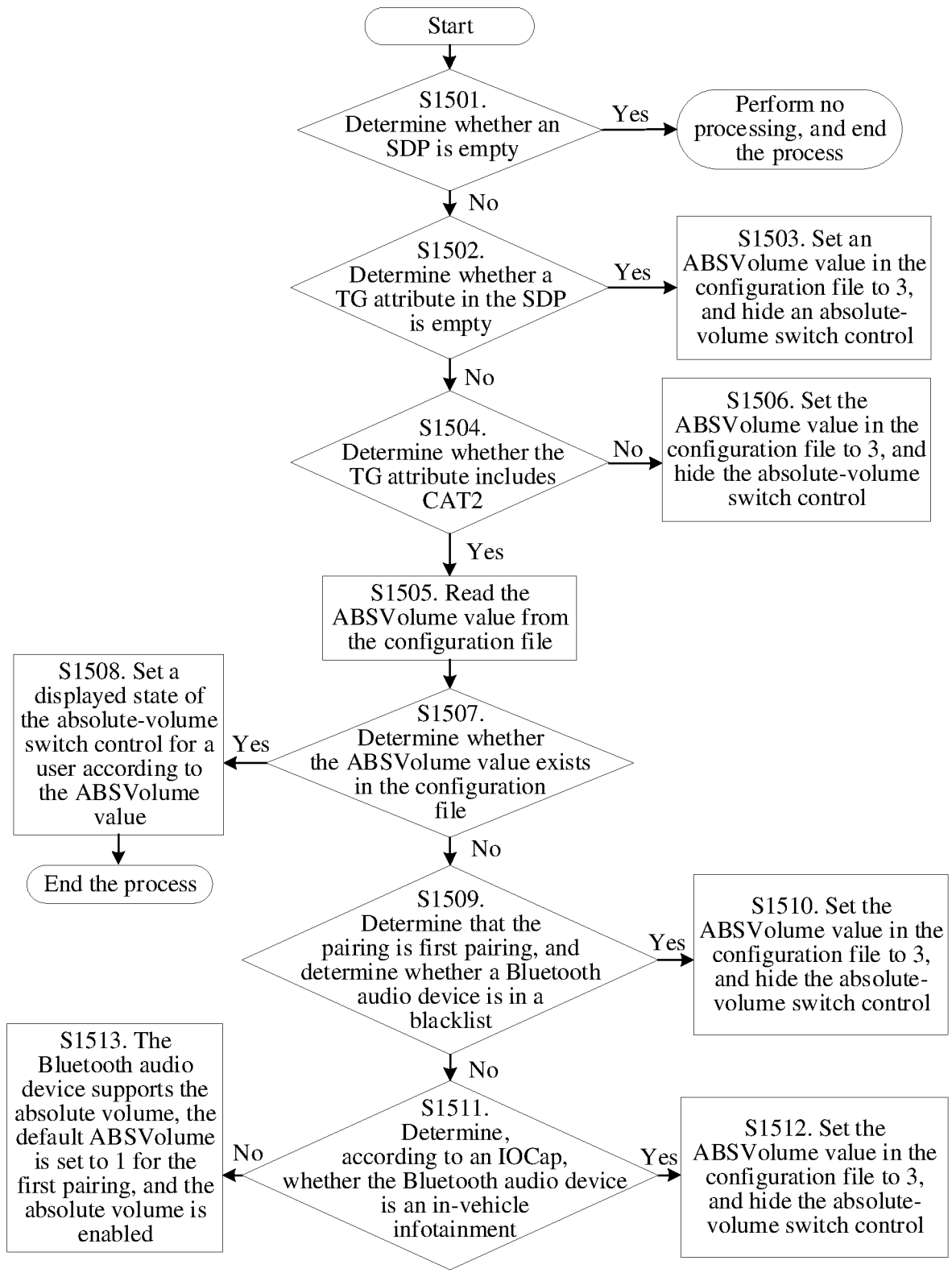
FIG. 15 is a schematic flowchart of still another volume management method according to an embodiment of this application.

For example, as shown in FIG. 15, based on the process of identifying the absolute volume of the Bluetooth audio device provided in the embodiment of FIG. 14, a process of identifying the onboard device is added. If the Bluetooth audio device is identified as the onboard device, the absolute volume of the device is disabled. After the step of start, the process specifically includes the following steps.

S1501: A smart terminal determines whether an SDP response message sent by a Bluetooth audio device is empty.

In some embodiments, if it is determined that the SDP is empty, no step is performed, and the process ends.

In some embodiments, if it is determined that the SDP is not empty, step S1502 may be performed.

S1502: The smart terminal determines whether a TG attribute in the SDP response message is empty.

In some embodiments, when it is determined that the TG attribute in the SDP is empty (that is, when a determining result of the step is no), the smart terminal may perform step S1503. That is to say, the ABSVolume value corresponding to the Bluetooth audio device in the configuration file is set to 3, and the absolute-volume switch control is hidden.

In some embodiments, when it is determined that the TG attribute in the SDP is not empty (that is, when the determining result of the step is yes), step S1504 may be performed.

S1504: The smart terminal determines whether the TG attribute includes CAT2.

In some embodiments, when the smart terminal determines that the TG attribute does not include CAT2 (that is, when the determining result of the step is no), the smart terminal may perform step S1506. That is to say, the ABSVolume corresponding to the Bluetooth audio device in the configuration file is set to 3, and the absolute-volume switch control is hidden.

In some embodiments, when the smart terminal determines that the TG attribute includes CAT2 (that is, when the determining result of the step is yes), the smart terminal may perform step S1505.

S1505: The smart terminal executes an operation of reading an ABSVolume value from the configuration file.

The configuration file is a configuration file corresponding to the Bluetooth audio device. Relevant description information of the absolute volume of the Bluetooth audio device may be stored in the configuration file.

S1507: The smart terminal determines whether the ABSVolume value exists in the configuration file.

In some embodiments, when the smart terminal determines that the ABSVolume value exists in the configuration file (that is, when the determining result of the step is yes), the smart terminal may perform step S1508 next. That is to say, the smart terminal may set, according to the ABSVolume value, a displayed state of the absolute volume switch for the user. Specifically, when the ABS Volume value is 1, the smart terminal may set the absolute-volume switch control to a visible state. That is to say, the management bar, the switch control, and the like of the absolute volume are presented to the user on the target interface of the smart terminal. When the ABSVolume value is 3, the smart terminal may set the absolute-volume switch control to the hidden state. That is to say, the management bar and the switch control, and the like of the absolute volume are invisible on the interface of the smart terminal. When the displayed state of the absolute-volume switch control is set, the process ends.

In some embodiments, when the smart terminal determines that no ABSVolume value exists in the configuration file (that is, the determining result of the step is no), the smart terminal may perform step S1509 next.

S1509: The smart terminal deems the Bluetooth audio device to be initially paired, and determines whether the Bluetooth audio device is in a blacklist.

The blacklist may include the device that is not allowed to use the absolute volume, and the user may add some Bluetooth audio devices to the blacklist according to requirements. For example, the user may add the identifier of the device, a manufacturer identifier corresponding to the device, the device model (model ID), or any combination of the information to the blacklist. In this way, the absolute volume of the corresponding device is not allowed.

In some embodiments, when the smart terminal determines that the Bluetooth audio device is in the blacklist (that is, the determining result of the step is yes), the smart terminal may perform step S1510. That is to say, the ABS Volume corresponding to the Bluetooth audio device in the configuration file is set to 3, and the absolute-volume switch control is hidden.

In some embodiments, when the smart terminal determines that the Bluetooth audio device is not in the blacklist (that is, the determining result of the step is no), the smart terminal may perform step S1511.

S1511: The smart terminal determines, according to an IOCap, whether the Bluetooth audio device is an in-vehicle infotainment.

In some embodiments, if the smart terminal determines, according to the IOCap, that the Bluetooth audio device is the in-vehicle infotainment (that is, the onboard device), then step S1512 may be performed. That is to say, the ABS Volume corresponding to the Bluetooth audio device in the configuration file is set to 3, and the absolute-volume switch control is hidden.

In some embodiments, if the smart terminal determines, according to the IOCap, that the Bluetooth audio device is not the in-vehicle infotainment, step S1513 may be performed next. That is to say, the smart terminal determines that the Bluetooth audio device supports the absolute volume, and it is deemed that the smart terminal is initially paired with the Bluetooth audio device. The ABSVolume value is set to 1 by default, and the absolute volume is enabled by default.

In some embodiments, the process that the smart terminal determines, according to the IOCap, whether the Bluetooth audio device is the in-vehicle infotainment may include the following. The smart terminal and the Bluetooth audio device exchange an input/output capability (IO capabilities) during the pairing. The smart terminal may determine, depending on whether the output capability of the Bluetooth audio device includes a display (display) capability, whether the Bluetooth audio device is the onboard device. Specifically, when the output capability of the Bluetooth audio device includes the display (display) capability, that is to say, when the Bluetooth audio device supports the display capability, it may be determined that the Bluetooth audio device is the onboard device. When the output capability of the Bluetooth audio device does not include the display (display) capability, that is to say, when the Bluetooth audio device does not support the display capability, it may be determined that the Bluetooth audio device is not the onboard device.

It should be understood that, in the implementation process corresponding to FIG. 15, before it is determined whether the type of the Bluetooth audio device is the onboard device, the process of determining whether the Bluetooth audio device supports the absolute volume is first performed. In some other implementations, it may be first determined whether the Bluetooth audio device is the onboard device. If it is determined that the Bluetooth audio device is the onboard device, the Bluetooth audio device is directly not allowed to use the absolute volume of the Bluetooth audio device, and it may be no longer identified whether the Bluetooth audio device supports the absolute volume. If it is determined that the Bluetooth audio device is not the onboard device, the process of determining whether the Bluetooth audio device supports the absolute volume described in the above embodiments of this application may be performed next. In the implementation, for the specific process of determining the onboard device and/or the specific process of determining whether the absolute volume is supported, reference may be made to the description in the above related content, and details will not be described herein again.

According to the volume management method provided in the embodiment of this application, the absolute volume of the Bluetooth audio device of the onboard device type is disabled by default, so as to avoid a problem that the user cannot obtain audio listening experience with a stable volume due to uneven performance of the onboard device in the absolute-volume function.

An embodiment of this application further provides a volume management system, including a smart terminal and a Bluetooth audio device. The smart terminal is configured to execute functions of the method in the above embodiments on the smart terminal. The Bluetooth audio device is configured to execute functions of the method in the above embodiment on the Bluetooth audio device.

An embodiment of this application further provides a non-transitory computer-readable storage medium. The non-transitory computer-readable storage medium stores a computer-executable program. The computer-executable program, when invoked by a computer, causes the computer to perform the volume management method in the above embodiments.

An embodiment of this application further provides a chip system, including: a communication interface, configured to input and/or output information: a memory, configured to store a computer-executable program; and a processor, configured to execute the computer-executable program, so that a device installed with the chip system performs the volume management method provided in the embodiment of this application.

All or some of the foregoing embodiments may be implemented by using software, hardware, firmware, or any combination thereof. When software is used for implementation, implementation may be entirely or partially performed in the form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instruction may be stored in a non-transitory computer-readable storage medium, or transmitted by using the non-transitory computer-readable storage medium. The computer instruction may be transmitted from a website, computer, server, or data center to another website, computer, server, or data center in a wired (for example, by using a coaxial cable, an optical fiber, or a digital subscriber line) or wireless (for example, infrared, radio, or microwave) manner. The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the procedures in the methods in the embodiments may be implemented by using a computer program instructing relevant hardware. The program may be stored in a non-transitory computer-readable storage medium. When the program runs, the procedures in the foregoing method embodiments may be performed. The foregoing storage medium includes: any medium that can store program code, such as a ROM, a RAM, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A volume management method, applicable to a smart terminal, comprising:
    sending a service function inquiry message to a Bluetooth audio device;
    receiving a service function response message sent by the Bluetooth audio device, wherein the service function response message comprises a control device (CT) attribute and a target device (TG) attribute determined by the Bluetooth audio device based on an audio/video remote control profile (AVRCP);
    determining, according to the TG attribute, whether the Bluetooth audio device supports an absolute volume; and
    setting an absolute-volume switch control corresponding to the Bluetooth audio device to a displayed state when it is determined that the Bluetooth audio device supports the absolute volume, so that the absolute-volume switch control is presented on an interface of the smart terminal,
    wherein the method further comprises:
    detecting a device type of the Bluetooth audio device, and setting the absolute-volume switch control corresponding to the Bluetooth audio device to the displayed state when it is determined according to a detection result that the Bluetooth audio device is not an onboard device.

2. The method according to claim 1, further comprising: setting the absolute-volume switch control corresponding to the Bluetooth audio device to a default enabled state.

3. The method according to claim 1, further comprising: receiving a first operation inputted by a user; and
    displaying, in response to the first operation, a first target interface when it is determined that the Bluetooth audio device supports the absolute volume, wherein the first target interface comprises the absolute-volume switch control corresponding to the Bluetooth audio device.

4. The method according to claim 3, further comprising: inquiring a configuration file for absolute-volume identification information corresponding to the Bluetooth audio device in response to the first operation of the user, wherein the absolute-volume identification information is used for indicating whether the Bluetooth audio device supports the absolute volume; and
    generating the absolute-volume switch control corresponding to the Bluetooth audio device when it is determined according to the absolute-volume identification information that the Bluetooth audio device supports the absolute volume.

5. The method according to claim 3, wherein the first operation comprises:
    tapping a setting application icon by the user; or
    tapping a Bluetooth device management bar by the user.

6. The method according to claim 3, wherein the first target interface is an interface in a setting application.

7. The method according to claim 1, wherein the detecting a device type of the Bluetooth audio device specifically comprises:
    detecting whether input/output capability IOCap information of the Bluetooth audio device comprises display capability information corresponding to the Bluetooth audio device; and
    determining that the device type corresponding to the Bluetooth audio device is the onboard device when the IOCap comprises the display capability information.

8. The method according to claim 1, wherein the determining, according to the TG attribute, whether the Bluetooth audio device supports an absolute volume specifically comprises:
    determining that the Bluetooth audio device supports the absolute volume when the TG attribute comprises CAT2 information of an audio and video monitor/amplifier; and
    determining that the Bluetooth audio device does not support the absolute volume when the TG attribute does not comprise the CAT2 information.

9. A non-transitory computer-readable storage medium, storing a computer-executable program, wherein the computer-executable program, when invoked by a computer, causes the computer to perform the method according to claim 1.

10. A volume management method, applicable to a smart terminal, comprising:
    sending a service function inquiry message to a Bluetooth audio device;
    receiving a service function response message sent by the Bluetooth audio device, wherein the service function response message comprises a control device (CT) attribute and a target device (TG) attribute determined by the Bluetooth audio device based on an audio/video remote control profile (AVRCP);
    determining, according to the TG attribute, whether the Bluetooth audio device supports an absolute volume; and
    setting an absolute-volume switch control corresponding to the Bluetooth audio device to a displayed state when it is determined that the Bluetooth audio device supports the absolute volume, so that the absolute-volume switch control is presented on an interface of the smart terminal,
    wherein the method further comprises:
    receiving a first operation inputted by a user; and
    displaying, in response to the first operation, a first target interface when it is determined that the Bluetooth audio device supports the absolute volume, wherein the first target interface comprises the absolute-volume switch control corresponding to the Bluetooth audio device,
    wherein the method further comprises:
    inquiring a configuration file for absolute-volume identification information corresponding to the Bluetooth audio device in response to the first operation of the user, wherein the absolute-volume identification information is used for indicating whether the Bluetooth audio device supports the absolute volume; and generating the absolute-volume switch control corresponding to the Bluetooth audio device when it is determined according to the absolute-volume identification information that the Bluetooth audio device supports the absolute volume, and wherein the generating the absolute-volume switch control corresponding to the Bluetooth audio device when it is determined according to the absolute-volume identification information that the Bluetooth audio device supports the absolute volume specifically comprises:

detecting whether the Bluetooth audio device is a device in a preset blacklist when the absolute-volume identification information indicates that the Bluetooth audio device supports the absolute volume; and generating the absolute-volume switch control corresponding to the Bluetooth audio device when the Bluetooth audio device is not the device in the preset blacklist.

11. A smart terminal, comprising at least one processor, a memory, and a communication interface, wherein the communication interface is configured to communicate with other devices, the memory stores computer program instructions that, when executed by the at least one processor, cause the smart terminal to perform operations comprising:

sending a service function inquiry message to a Bluetooth audio device;

receiving a service function response message sent by the Bluetooth audio device, wherein the service function response message comprises a control device (CT) attribute and a target device (TG) attribute determined by the Bluetooth audio device based on an audio/video remote control profile (AVRCP);

determining, according to the TG attribute, whether the Bluetooth audio device supports an absolute volume; and setting an absolute-volume switch control corresponding to the Bluetooth audio device to a displayed state when it is determined that the Bluetooth audio device supports the absolute volume, so that the absolute-volume switch control is presented on an interface of the smart terminal, wherein the operations further comprise:
detecting a device type of the Bluetooth audio device; and
setting the absolute-volume switch control corresponding to the Bluetooth audio device to the displayed state when it is determined according to a detection result that the Bluetooth audio device is not an onboard device.

12. The smart terminal according to claim 11, wherein the operations further comprise:
setting the absolute-volume switch control corresponding to the Bluetooth audio device to a default enabled state.

13. The smart terminal according to claim 11, wherein operations further comprise:

receiving a first operation inputted by a user; and
displaying, in response to the first operation, a first target interface when it is determined that the Bluetooth audio device supports the absolute volume, wherein the first target interface comprises the absolute-volume switch control corresponding to the Bluetooth audio device.

14. The smart terminal according to claim 13, wherein the operations further comprise:
inquiring a configuration file for absolute-volume identification information corresponding to the Bluetooth audio device in response to the first operation of the user, wherein the absolute-volume identification information is used for indicating whether the Bluetooth audio device supports the absolute volume; and generating the absolute-volume switch control corresponding to the Bluetooth audio device when it is determined according to the absolute-volume identification information that the Bluetooth audio device supports the absolute volume.

15. The smart terminal according to claim 14, wherein the generating the absolute-volume switch control corresponding to the Bluetooth audio device when it is determined according to the absolute-volume identification information that the Bluetooth audio supports the absolute volumes comprises:

detecting whether the Bluetooth audio device is a device in a preset blacklist when the absolute-volume identification information indicates that the Bluetooth audio device supports the absolute volume; and generating the absolute-volume switch control corresponding to the Bluetooth audio device when the Bluetooth audio device is not the device in the preset blacklist.

16. The smart terminal according to claim 13, wherein the operations further comprise:
tapping a setting application icon by the user; or
tapping a Bluetooth device management bar by the user.

17. The smart terminal according to claim 11, wherein the detecting a device type of the Bluetooth audio device comprises:

detecting whether input/output capability (IOCap) information of the Bluetooth audio device comprises display capability information corresponding to the Bluetooth audio device; and determining that the device type corresponding to the Bluetooth audio device is the onboard device when the IOCap comprises the display capability information.

18. The smart terminal according to claim 11, wherein operations further comprise:
determining that the Bluetooth audio device supports the absolute volume when the TG attribute comprises CAT2 information of an audio and video monitor/amplifier; and determining that the Bluetooth audio device does not support the absolute volume when the TG attribute does not comprise the CAT2 information.

* * * * *

UNITED STATES PATENT AND TRADEMARK OFFICE
CERTIFICATE OF CORRECTION

PATENT NO. : 12,348,662 B2  
APPLICATION NO. : 18/010278  
DATED : July 1, 2025  
INVENTOR(S) : Deyuan Wang Page 1 of 1

It is certified that error appears in the above-identified patent and that said Letters Patent is hereby corrected as shown below:

In the Specification

Column 18, Line 44, change "HC1" to --HCI--;

Column 18, Line 63, change, "HC1" to --HCI--;

Column 19, Line 18, change "HC1" to --HCI--;

Column 19, Line 4, change "HC1" to --HCI--;

In the Claims

Column 38, Claim 15, Line 23, change "audio supports the absolute volumes" to --audio device supports the absolute volume--; and Column 38, Claim 18, Lines 46 and 47, change, "wherein operations" to --wherein the operations--.

Signed and Sealed this  
Twenty-ninth Day of July, 2025

Coke Morgan Stewart  
*Acting Director of the United States Patent and Trademark Office*